(12) United States Patent
Chung et al.

(10) Patent No.: US 8,593,019 B2
(45) Date of Patent: Nov. 26, 2013

(54) STRUCTURE FOR LINEAR AND ROTARY ELECTRIC MACHINES

(75) Inventors: Shi Uk Chung, Changwon (KR); Do Hyun Kang, Changwon (KR); Byung Chul Woo, Changown (KR); Ji Won Kim, Busan (KR); Ji Young Lee, Changwon (KR); Seung Ryul Moon, Changwon (KR)

(73) Assignee: Korea Electrotechnology Research Institute, Changwon (KR)

( * ) Notice: Subject to any disclaimer, the term of this patent is extended or adjusted under 35 U.S.C. 154(b) by 682 days.

(21) Appl. No.: 12/759,640

(22) Filed: Apr. 13, 2010

(65) Prior Publication Data

US 2010/0259112 A1 Oct. 14, 2010

(30) Foreign Application Priority Data

Apr. 13, 2009 (KR) ........................ 10-2009-0031785

(51) Int. Cl.
- *H02K 41/03* (2006.01)
- *H02K 37/02* (2006.01)
- *H02K 37/04* (2006.01)
- *H02K 37/06* (2006.01)

(52) U.S. Cl.
USPC ................. 310/49.46; 310/49.25; 310/49.26; 310/49.27; 310/49.28; 310/49.35

(58) Field of Classification Search
USPC ...................... 310/49.46, 49.25–49.28, 49.35
IPC ........................ H02K 41/03,37/02, 37/04, 37/06
See application file for complete search history.

(56) References Cited

U.S. PATENT DOCUMENTS

| | | | | |
|---|---|---|---|---|
| 3,158,765 A | * | 11/1964 | Polgreen | 310/12.09 |
| 4,563,602 A | * | 1/1986 | Nagasaka | 310/12.22 |
| 4,713,570 A | * | 12/1987 | Mastromattei | 310/181 |
| 4,827,164 A | * | 5/1989 | Horber | 310/49.37 |
| 4,972,108 A | * | 11/1990 | Venturini | 310/12.22 |
| 5,218,250 A | * | 6/1993 | Nakagawa | 310/12.21 |
| 6,069,416 A | * | 5/2000 | Chitayat | 310/12.05 |
| 6,376,957 B1 | * | 4/2002 | Haydock et al. | 310/155 |
| 7,193,339 B2 | * | 3/2007 | Uchida | 310/12.19 |
| 7,928,612 B2 | * | 4/2011 | Chung et al. | 310/12.24 |
| 2002/0113496 A1 | * | 8/2002 | Hollis | 310/12 |
| 2006/0197393 A1 | * | 9/2006 | Labriola | 310/68 B |
| 2007/0126305 A1 | * | 6/2007 | Okuma et al. | 310/156.53 |
| 2007/0222304 A1 | * | 9/2007 | Jajtic et al. | 310/12 |
| 2008/0088200 A1 | * | 4/2008 | Ritchey | 310/268 |
| 2008/0179981 A1 | * | 7/2008 | Edelson | 310/166 |
| 2009/0009010 A1 | * | 1/2009 | Chung et al. | 310/46 |
| 2009/0045421 A1 | * | 2/2009 | Ho et al. | 257/98 |
| 2009/0072634 A1 | * | 3/2009 | Vollmer | 310/12 |

* cited by examiner

*Primary Examiner* — Terrance Kenerly

(57) ABSTRACT

Disclosed herein is a structure for linear and rotary electric machines. The present invention provides a modular mover structure which includes coils that have an electrical phase difference of 180°, so that the path of magnetic flux is shortened, thus reducing the size of the machine and mitigating the back-EMF unbalance. The modular mover structure can be modified into various shapes. For example, when a skew structure is applied to a mover or stator iron core, the force ripples in an electric machine can be reduced. In addition, when a hinge structure is applied to a modular mover iron core, the mover can move in a linear and curved manner. The structure of the present invention can be applied to a rotary electric machine. In this case, because the number of poles is easily increased, a low speed high torque direct drive type rotary electric machine is realized.

34 Claims, 21 Drawing Sheets

STRUCTURE FOR LINEAR AND ROTARY ELECTRIC MACHINES

BACKGROUND OF THE INVENTION

1. Field of the Invention

The present invention generally relates to structures for linear and rotary electric machines and, more particularly, to an electric machine which has a modular mover iron core structure such that the path of magnetic flux thereof is shortened, thus reducing the size of the machine and mitigating the unbalance of load back electromotive force (back-EMF), compared to a conventional flux reversal electric machine. Furthermore, the present invention provides various modifications of the proposed embodiment of the electric machine. An example of this would be a linear electric machine in which a hinge structure is applied to a modular mover iron core so that the mover can move in a linearly or curved fashion, or a rotary electric machine that is derived from the proposed linear electric machine.

2. Description of the Related Art

Generally, linear electric machines have been widely used for precision position control. A permanent magnet linear synchronous motor is a representative example of such a conventional linear electric machine. However, in a conventional permanent magnet linear synchronous motor, the permanent magnets are provided on a stator. Therefore, as the distance a mover moves increases, the number of permanent magnets used increases, resulting in an increase in production costs. In addition, due to the end effect induced on the entry end and the exit end of the mover, there is pulsation of thrust and normal force. Furthermore, due to the fact that leakage flux from the permanent magnets attached to the stator affects the area close to the machine, it cannot be applied in some fields. Moreover, in the case of a low speed and a high torque direct drive type rotary motor, a large number of poles would be needed. Here, in a conventional electric machine, it is very difficult to increase the number of poles due to structural limitations, and it is also not easy to use a skew structure to reduce pulsations of torque.

SUMMARY OF THE INVENTION

Accordingly, the present invention has been made keeping in mind the above problems occurring in the prior art, and an object of the present invention is to provide a linear or rotary electric machine which is configured such that the permanent magnets are attached to an iron mover core and a stator has no permanent magnet, thus reducing the material cost for the permanent magnets.

Another objective of the present invention is to provide a linear or rotary electric machine which has a modular mover structure including a pair of coils which have an electrical phase difference of 180°, so that the path of its magnetic flux is shortened compared to that of the conventional flux reversal electric machine, thus reducing the size of the entire machine, thereby enhancing the thrust per volumetric unit.

Furthermore, the modular mover structure can mitigate the unbalance of load back-EMF which is induced in a structure in which the permanent magnets are arranged so that the same poles thereof are oriented in the same direction. In a case where a hinge structure is used in the modular mover structure, the mover can move in a linear or curved direction. In this case, the electric machine can be used in various application fields.

In addition to the above, when the structure proposed in the present invention is applied to a rotary electric machine, it becomes easy to increase the number of poles of the electric machine. Because the above-mentioned modular mover structure can also be applied to the rotary electric machine, a problem of unbalance of load back-EMF can be mitigated. Therefore, a direct drive low speed and high torque rotary electric machine can be realized.

Moreover, in the linear or rotary electric machine according to the present invention, the stator and the mover (or the rotor) can be made of iron cores with laminated structures. Therefore, a skew structure can be easily applied to the iron cores. Thus, the force ripples can be mitigated, so that a low noise/low vibration and high precision position control drive can be ensured.

As well, in the mover structure according to the present invention, the number and arrangement of the toothed mover protrusions and permanent magnets can be modified in various manners. In the case where a structure using flux concentrator is used, the air-gap flux density increases, thus increasing the thrust and torque of the machine.

Furthermore, at least one thin cooling unit may be provided in the mover to enhance the cooling performance as necessary in an application system. In the case where the thin cooling unit uses air cooling, the stator and the mover can be cooled at the same time by the air discharged from the outlet of the cooling unit. In addition, the impurities can be removed from the air gap between the stator and the mover by the pressure of the air discharged from the outlet. The thin cooling unit may be applied to the rotary electric machine in the same way as in above example.

A further object of the present invention is to provide an electric machine which can have various structures needed for system applications. An example of this is where stators are positioned on opposite sides of a mover or movers and are positioned on opposite sides of a stator, so that the attractive force between the stator and the mover can be canceled.

In order to accomplish the above object, in an aspect, the present invention provides a linear electric machine which has a modular mover structure including a pair of coils that have an electrical phase difference. This shortens the path of the magnetic flux, thereby reducing the size of the entire machine and mitigating the load back-EMF unbalance.

The mover may move in a linear or curved manner with respect to the stator. A plurality of toothed mover protrusions may be provided at each end of the mover teeth. Permanent magnets may be positioned on the left and right sides of each toothed mover protrusion. The toothed mover protrusions may be selectively replaced by permanent magnets. As mentioned above, the machine can be modified in various ways.

Furthermore, the mover may comprise modular movers which are in multiples of three and are arranged at regular intervals in the same direction as the movers move. The end of each of the mover teeth may have a length corresponding to an integral number of a pole interval between the permanent magnets with respect to the movement direction of the mover.

In addition, the mover of the linear electric machine may include a thin cooling unit which is assembled with a mover iron core in a laminated manner, thus providing a cooling effect and advantages in that impurities can be removed from air gap between the mover and the stator or prevented from entering the air gap. The thin cooling unit may be applied to a rotary electric machine which will be explained later in such a way that the thin cooling unit is assembled with the stator of the rotary electric machine in a laminating manner to provide the same effect as the above. In addition, the thin cooling unit may be applied to the conventional electric machine to provide the same effect as the above.

In an electric machine according to the present invention, where only permanent magnets are provided on the mover such that the same poles are oriented in the same direction, the mover may be manufactured in such a way that the non-magnetized permanent magnets are attached at predetermined positions and then the permanent magnets are magnetized after the assembly of the other elements is completed.

The iron core of the stator or the mover may be manufactured in a laminated structure so that the stator teeth and the mover teeth face each other in a skew shape.

The stator may have a curved course along which the mover moves.

The mover iron core may have a hinge or the mover iron cores may be attached to a structure that has at least one hinge. Therefore, when the mover moves with respect to the stator, the mover is bent by the hinge at a corresponding curvature so that it can move smoothly along the curved course.

In another aspect, the present invention provides a rotary electric machine which has the same modular mover structure as that of the linear electric machine. In this case, the modular mover of the linear electric machine corresponds to a modular stator of the rotary electric machine. The stator of the linear electric machine corresponds to a rotor of the rotary electric machine.

In a further aspect, the present invention provides a rotary electric machine in which a rotor rotates inside or around a modular stator in a circumferential direction. At least one toothed stator protrusion is provided on the end of each of the stator teeth. Permanent magnets are positioned on left and right sides of the toothed stator protrusion such that the same poles are oriented in the same direction. Alternatively, toothed stator protrusions can be provided on the end of each of the stator teeth, and the permanent magnets can be respectively positioned between the toothed rotor protrusions so that the same poles are oriented in the same direction. The stator may comprise modular stators which are in multiples of three and are arranged at regular intervals with respect to the circumferential direction.

In still another aspect, the present invention provides a rotary electric machine in which a rotor rotates inside or around a modular stator in a circumferential direction and the end of the rotor includes permanent magnets which are circumferentially provided between the rotor teeth such that the same poles are oriented in the same direction. The stator may comprise modular stators which are in multiples of three and are arranged at regular intervals with respect to the circumferential direction. Each of the stator teeth has a plurality of toothed stator protrusions on the end thereof.

In still another aspect, the present invention provides a rotary electric machine which is configured such that an axial air gap is formed in the above-mentioned structure. In this case, several axial air gap electric machines may be arranged in an axial direction so that rotary electric machines are provided coaxially. Stators may be provided on opposite sides of a rotor with respect to the axial direction or the rotors may be provided on opposite sides of a stator with respect to the axial direction so that magnetic attractive force can be canceled.

Here, the iron core of the stator or the rotor may be manufactured in a laminated structure such that the stator teeth and the rotor teeth face each other in a skew shape.

Although the above-mentioned embodiments of the electric machine have been illustrated on the basis of a three-phase structure, an electric machine having an n-phase structure (n denotes a natural number) other than a three-phase structure can also be realized. In the case of the electric machine having an n-phase structure, the electric phase interval a becomes 180°/n instead of 120°, and the number of modular mover/stator teeth or rotor/stator teeth becomes a multiple of n. For example, in the case of a five-phase electric machine, the electric phase interval a becomes 36°, and the number of teeth becomes a multiple of five.

In still another aspect, the present invention provides an electric machine which includes a stator and at least two movers which move with respect to the stator and are spaced apart from each other at intervals corresponding to an electrical phase difference of 60°. Each of the movers has mover teeth in multiples of three. Phase coils are formed by coils which are wound around the mover teeth. The coils are wound around the corresponding mover teeth such that the electric phase difference between the phase coils of the adjacent mover teeth is 120°. At least one protrusion is provided at the ends of the stator teeth or at the ends of the mover teeth and at least one permanent magnet is provided on each of the left and right sides of the protrusion, or permanent magnets are provided at the ends of the stator teeth or at the ends of the mover teeth such that the opposite poles thereof alternate with each other.

The movers may comprise a first mover and a second mover which are spaced apart from each other at an interval corresponding to an electrical phase difference of 60°. The first mover may have mover teeth in multiples of three. Phase coils are wound around the mover teeth. The phase coils may have phases U, V and W such that the electric phase difference between the adjacent phases is 120°. The second mover may have mover teeth in multiples of three. Phase coils may, be wound around the mover teeth of the second mover. The phase coils of the second mover may have phases /U, /V and /W such that the electric phase difference between the adjacent phases is 120° (the electric phase difference between /U and U is 180°, the phase difference between /V and V is 180° and the phase difference between /W and W is 180°).

In still another aspect, the present invention provides an electric machine which includes a stator that has stator teeth; and a mover moving with respect to the stator, the mover has mover teeth in multiples of three. Phase coils are provided on the mover teeth such that the electric phase difference between the phase coils of the adjacent mover teeth is 60°. At least one protrusion is provided at the ends of the stator teeth or at the ends of the mover teeth and at least one permanent magnet is provided on each of the left and right sides of the protrusion, or permanent magnets are provided at the ends of the stator teeth or at the ends of the mover teeth such that the opposite poles thereof alternate with each other.

In still another aspect, the present invention provides an electric machine which includes a stator having stator teeth; and a rotor rotating inside or around the stator, the rotor having rotor teeth in multiples of three. Phase coils are provided on the rotor teeth such that the electric phase difference between the phase coils of the adjacent rotor teeth is 60°. At least one protrusion is provided at the ends of the stator teeth or at the ends of the rotor teeth and at least one permanent magnet is provided on each of the left and right sides of the protrusion, or permanent magnets are provided at the ends of the stator teeth or at the ends of the rotor teeth such that the opposite poles thereof alternate with each other.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1A:
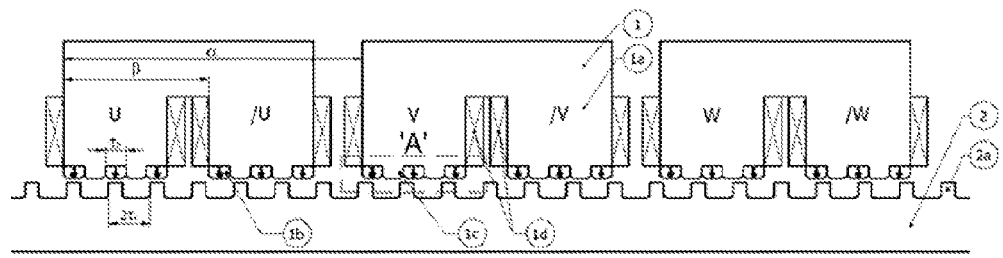
FIGS. 1A through 1D are views illustrating examples of a linear electric machine including a mover and a stator, according to an embodiment of the present invention.

Hereinafter, preferred embodiments of the present invention will be described in detail with reference to the attached drawings, but the present invention is not limited to the embodiments and various modifications are possible using a combination of the embodiments. Furthermore, a reference now should be made to the drawings, in which the same reference numerals are used throughout the different drawings to designate the same or similar components.

The electric machines described in the present invention are energy conversion devices which convert electric energy into kinetic energy or convert kinetic energy into electric energy, for example, including a motor, an actuator and a generator. In addition, the electric machines mean devices which implement the above-mentioned energy conversion using linear motion, rotation or a combination of linear motion and rotation.

Figure 1B:
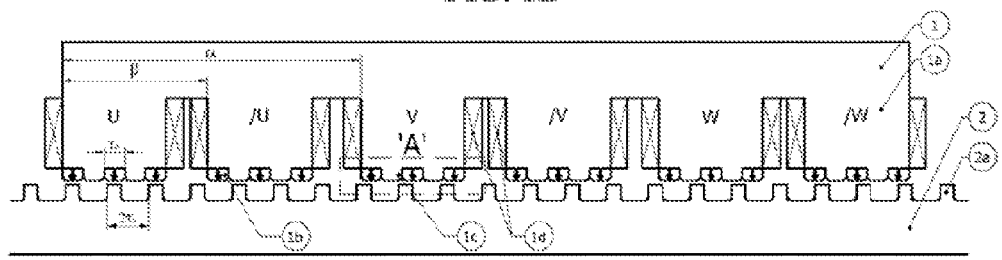
Figure 1C:
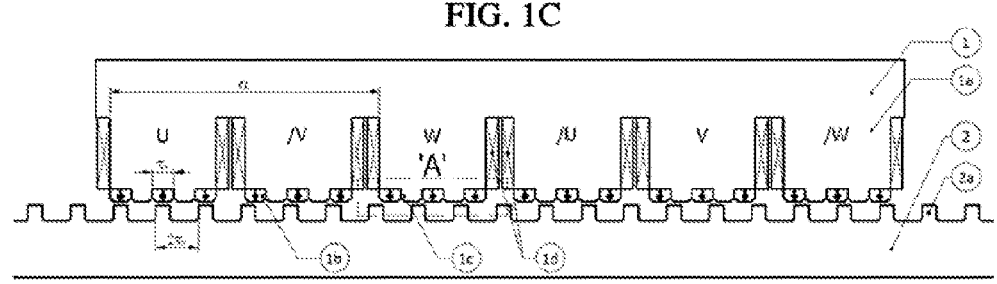
Figure 1D:
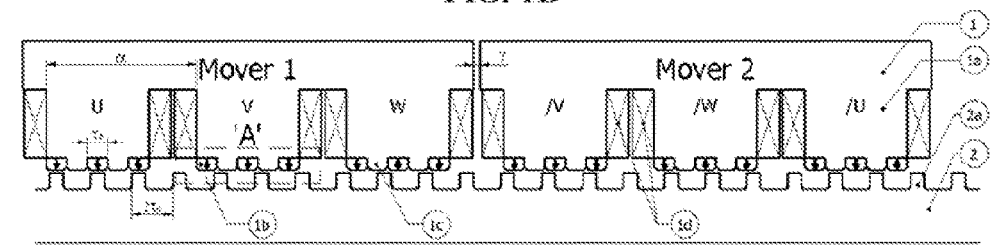

FIGS. 1A through 1D are views illustrating examples of the construction of a linear electric machine and the arrangement of modular movers, according to an embodiment of the present invention. FIG. 1A illustrates a modular mover with a structure in which the mover modules are mechanically separated from each other. FIG. 1B illustrates a modular mover with a structure in which the mover modules are mechanically integrated with each other. FIGS. 1C and 1D illustrates modifications of the modular mover structure in which the positions of the bar phases /U, /V and /W differ from the above-mentioned examples. In FIG. 1D, a distance γ between mover modules (Mover1 and Mover2) becomes an electrical phase difference of 60°. Although the case of FIG. 1D has been illustrated in FIG. 1D as being configured such that the mover modules (Mover1 and Mover2) that have the same mover iron core are mechanically separated from each other, they may be mechanically integrated with each other, as illustrated in FIGS. 1B and 1C.

Referring to FIG. 1A, the linear electric machine according to the embodiment of the present invention includes modular movers, a stator iron core 2 and stator teeth 2a. Each modular mover includes an 'n'-shaped mover iron core 1, two mover teeth 1a, permanent magnets 1b, toothed mover protrusions 1c and mover coils 1d. The stator teeth 2a are provided on a side of the stator iron core 2 at positions spaced apart from each other at regular intervals. The toothed mover protrusions 1c are positioned between the permanent magnets 1b which are provided on the end of each of the two mover teeth 1a of the modular mover. The toothed mover protrusions 1c are spaced apart from each other at regular intervals.

As shown in FIG. 1A, when a pole interval of the permanent magnets is designated by the character $\tau_p$, the stator teeth 2a are arranged at intervals of $2\tau_p$. The mover teeth 1a are arranged at intervals of β. In each modular mover, the mover coils 1d which are assembled with the two mover teeth 1a electrically have an interval of 180° (for example, the directions in which coils are wound are opposite each other, or the coils that have the same winding direction are connected in such a way that the leading end of one coil is connected to the tailing end of a neighboring coil such that the directions in which the current flows through the adjacent coils are opposite to each other). The phases of the three modular movers are arranged in a configuration with (U, /U), (V, /V) and (W, /W) (here, '/' denotes a phase angle difference of 180°). The modular movers are arranged at intervals of α. Here, an electrical phase difference between the adjacent modular movers (for example, between U-V, V-W or W-U) becomes 120°.

FIG. 1B illustrates a structure where the three modular movers of FIG. 1A are mechanically integrated with each other. The structure of FIG. 1B has the same effect as that of FIG. 1A in which the three modular movers are separated from each other.

FIG. 1C illustrates a structure where the arrangement of the phases of a modular mover differ from that of FIG. 1B. Specifically, in FIG. 1C, the phases of the coils 1d wound around six mover teeth 1a are arranged in a U, /V, W, /U, V and /W configuration. Therefore, in the case where the mover teeth 1a are not spaced apart from each other, the phase difference between the mover teeth 1a becomes 60°. The structure of FIG. 1C may be modified into the structure shown in FIG. 1D in which the modular mover is divided into modular movers (Mover1 and Mover2) so that mover teeth, in multiples of three (for example, three mover teeth) are integrated with each other. Here, in the case where the modular movers (Mover1 and Mover2) are arranged at an interval of γ(60°) (for example, between U-/V, W-/U or V-/W), the phase coils 1d can be wound around the mover teeth such that an electrical phase-difference of 120° exists between the phases of the adjacent mover teeth (for example, between U-V, V-W or W-U). Here, at the ends of the stator teeth or at the ends of the mover teeth, one or more permanent magnets are provided on opposite sides of each of one or more protrusions, or permanent magnets are arranged in an alternate manner such that the opposite poles of the adjacent permanent magnets face each other.

When the overall number of coil phases is n (n denotes a natural number), the mover teeth or modular movers, including the two mover teeth, can be arranged at electrical intervals of 180°/n. The number of teeth may be an exact multiple of n. Furthermore, when the iron core of the stator or mover is manufactured in a laminating manner, the stator teeth and the mover teeth may be skewed so that they face each other in a skew shape, thus mitigating the force ripples.

Figure 2:
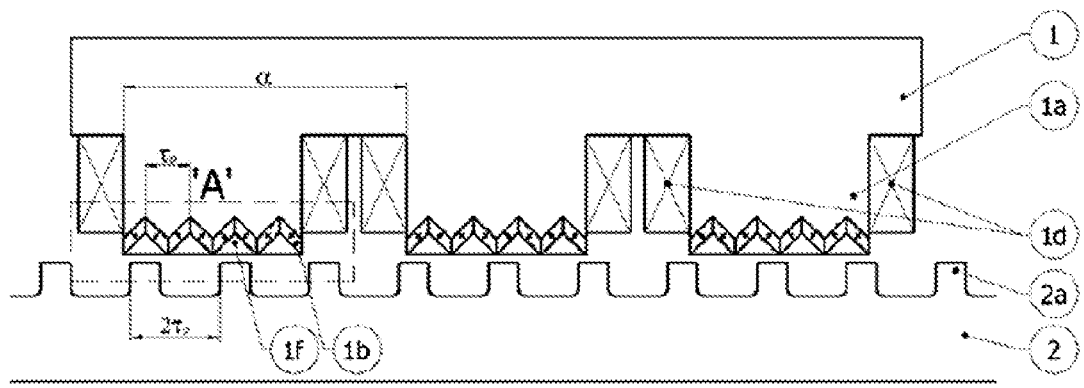
FIG. 2 is a view showing the structure of flux concentrator provided in the linear electric machine according to the embodiment of the present invention.

FIG. 2 is a view showing the construction of a mover having a plurality of flux concentrators 1f according to the present invention. In case of the mover having the flux concentrators 1f, mover teeth 1a in multiples of three are provided and phases of coils 1d wound around the mover teeth 1a are arranged at regular electric intervals of 120°. Furthermore, in the structure that has the flux concentrators 1f, one magnet pole is formed in such a way that one magnet concentrator 1f is provided between a plurality of permanent magnets 1b (for example, between two permanent magnets configured so that they face each other at a predetermined angle). When such magnet poles are arranged in a line, the interval between the magnet poles becomes $\tau_p$.

Figures 3A, 3B, 3C, 3D, 3E:
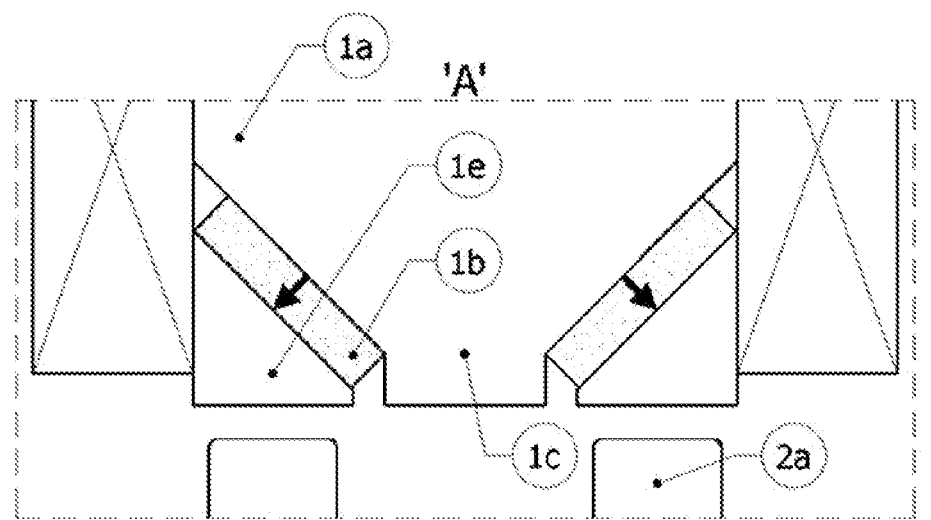
FIGS. 3A through 3H are views illustrating various examples of mover teeth, a permanent magnet, toothed mover protrusions, pole pieces and flux concentrators according to the present invention.

FIGS. 3A through 3E are views illustrating various examples of mover teeth 1a according to the present invention. FIGS. 3A through 3D illustrate several examples of the construction of the end 'A' of each of the mover teeth from FIG. 1. Specifically, FIGS. 3A and 3B illustrate examples of cases where the permanent magnets 1b which are arranged such that the same poles are oriented in the same direction are provided on the left and right sides of each of the toothed mover protrusions 1c. FIG. 3C shows the case where a cavity is formed in the mover tooth 1a. In this case, due to the cavity having an appropriate volume within a range in which it does not impede the flow of the magnetic flux, the weight of the iron core of a mover can be reduced. FIG. 3D shows a mover tooth that has a pole shoe (for example, the upper portion, around which the coils are wound, is thinner than the lower portion on which the toothed mover protrusions are formed).

FIG. 3E illustrates an example in which a mover tooth 1a has ramp surfaces on left and right sides thereof, and permanent magnets 1b are respectively provided on the ramp surfaces, and a flux guide pole piece 1e is provided under each permanent magnet 1b.

Figure 3F:
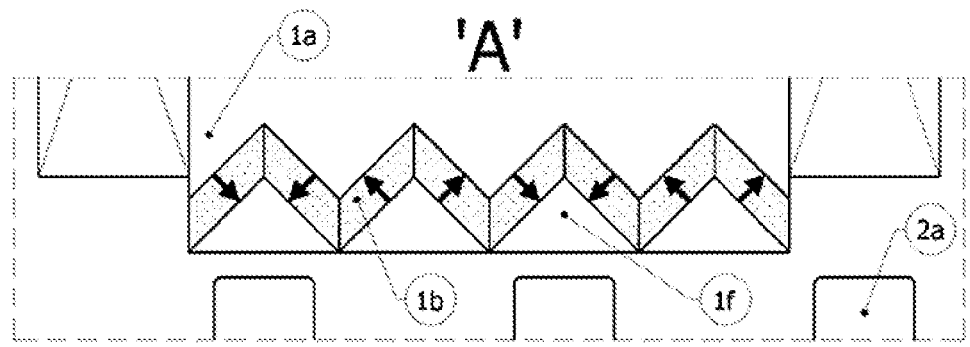
Figure 3G:
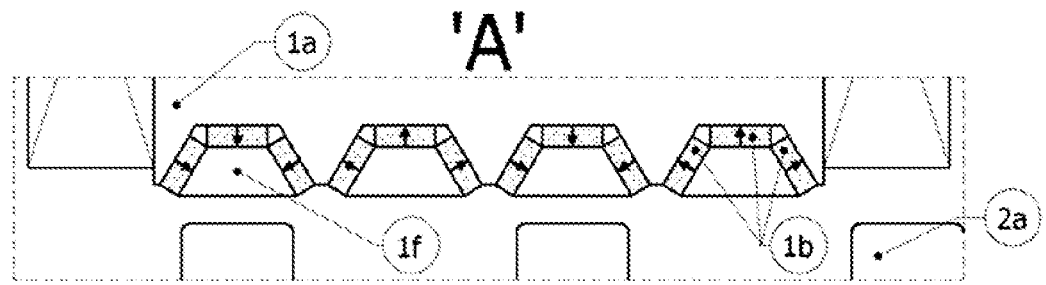
Figure 3H:
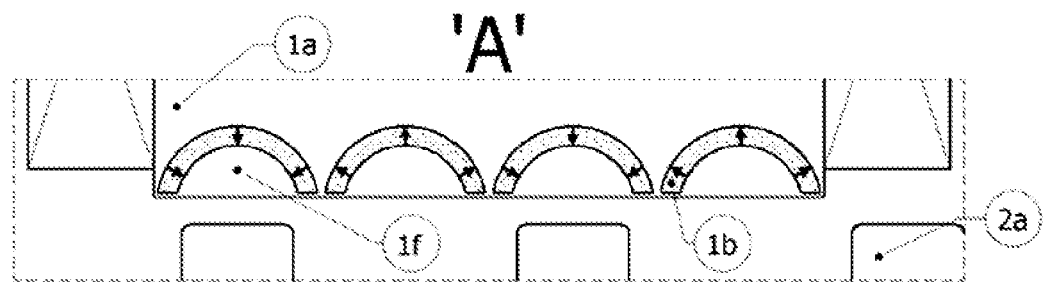

FIGS. 3F through 3H illustrate several examples of mover teeth 1a that have flux concentrators 1f. In these examples, the mover tooth 1a is configured such that permanent magnets 1b are embedded in the mover tooth 1a so that magnetic flux generated from the permanent magnets 1b is concentrated to increase the air-gap flux density. Here, permanent magnets may form an angled or curved shape. For instance, plural permanent magnets may be provided around the perimeter of each flux concentrator 1f other than in the portion of the flux concentrator that faces the stator (refer to FIGS. 3F and 3G). Alternatively, a permanent magnet may have a semicircular shape and be provided around a flux concentrator, "1f" (refer to FIG. 3H). In the case where the structure has flux concentrators 1f, one magnet pole is formed in such a way that one flux concentrator if is assembled with permanent magnets 1b. Here, the interval between magnet poles becomes $\tau_p$. Furthermore, all of the permanent magnets of the electric machines proposed in the embodiments of the present invention may be modified into a structure that has flux concentrators. FIGS. 3F and 3G illustrate examples of a case where the flux concentrators 1f are separated from the mover tooth 1a in such a way that two or three of the angled permanent magnets are provided between the flux concentrators 1f and the mover tooth 1a. In the case of FIG. 3H, when the mover teeth 1a are formed by stamping, portions that will be flux concentrators 1f are also formed by stamping along with the mover teeth 1a. Thereafter, the semicircular permanent magnets are mechanically inserted between the flux concentrators 1f and the mover teeth, 1a. Therefore, the flux concentrators 1f, the mover teeth 1a and the permanent magnets are integrated with each other.

The pole piece or the flux concentrator may have a curved shape or a polygon shape, for example, a triangular shape, a rectangular shape, a square shape, a trapezoidal shape or a pentagonal shape, as shown in FIG. 3. In addition, the curved or polygon pole pieces or flux concentrators may be combined with each other.

Figure 4:
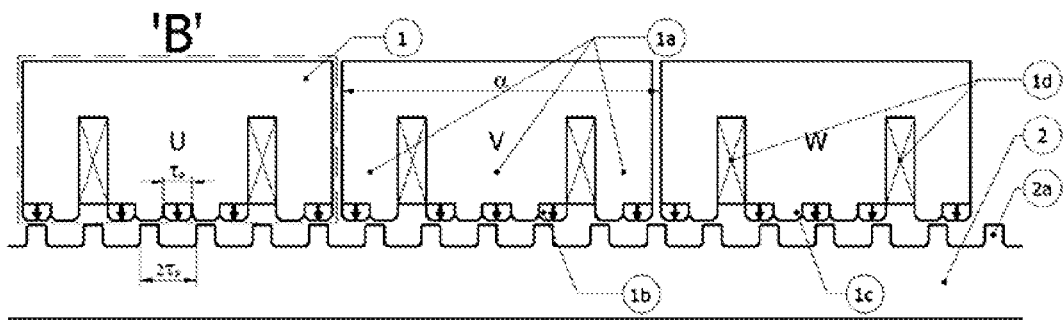
FIG. 4 is a view illustrating a linear electric machine with an 'm'-shaped mover iron core structure according to the present invention.

FIG. 4 illustrates another embodiment of the present invention. In this embodiment, a mover iron core 1 has an 'm'-shape such that three mover teeth 1a are formed. A mover coil 1d is wound around the middle of one of the three mover teeth, 1a. The toothed mover protrusions 1c are provided between permanent magnets 1b which are positioned at the end of the medial mover tooth 1a, so that the toothed mover protrusions 1c and the permanent magnets 1b alternate with each other. Furthermore, the toothed mover protrusions 1c are provided at the ends of the side mover teeth 1a which are positioned on opposite sides of the medial mover tooth 1a. Permanent magnets poles, which are oriented in the same direction as those of the permanent magnets provided on the medial mover tooth 1a are provided beside the toothed mover protrusions 1c. Here, the mover iron cores are arranged at intervals of α to have an electrical phase angle of 120°.

FIGS. 5A through 5F are views showing various examples of portion 'B' of FIG. 4 and illustrating flux Φ (refer to the arrows) of each example. As shown in FIGS. 5A through 5F, the structure of the mover can be modified in various ways depending both on the number of toothed mover protrusions 1c provided at the ends of the mover teeth and on arrangement of the toothed mover protrusions 1c and the permanent magnets.

Figure 5A:
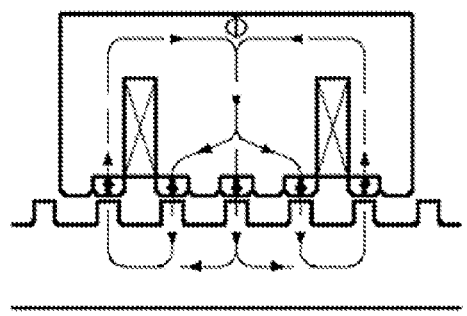
FIGS. 5A through 5F are views showing various examples of the 'm'-shaped mover iron core structure of FIG. 4.
Figure 5B:
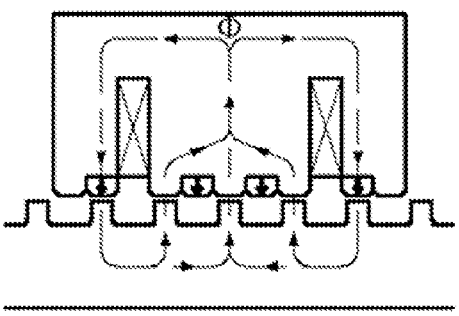
Figure 5C:
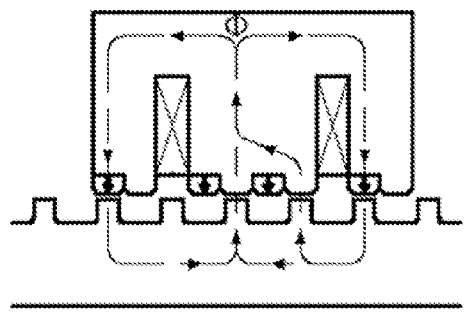
Figure 5D:
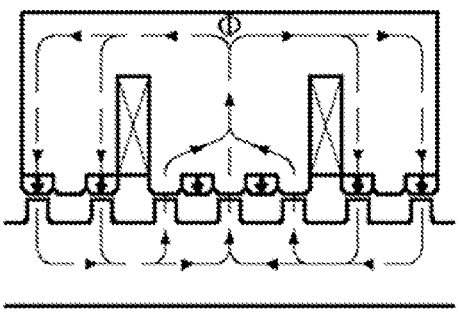
Figure 5E:
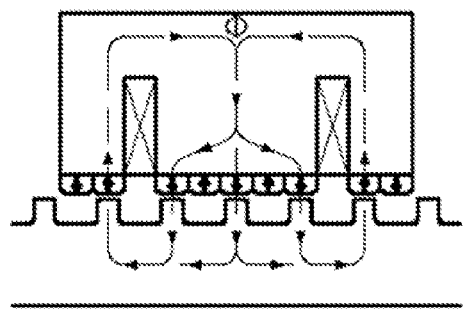
Figure 5F:
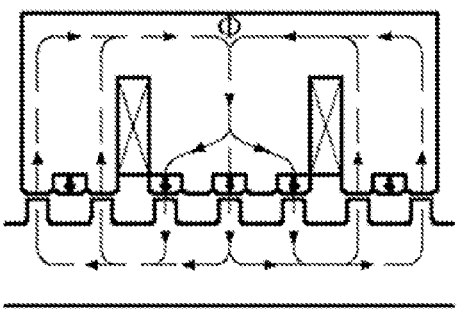

In the case of FIG. 5A, a positional order of toothed mover protrusions 1c and the permanent magnets of the side mover teeth which are positioned on opposite sides of the medial one of three mover teeth is opposite to that of FIG. 4. In addition, the permanent magnets of the side mover teeth are oriented such that the orientation of poles thereof is opposite to that of FIG. 4. The case of FIG. 5B has a structure such that the toothed mover protrusions 1c and the permanent magnets of the medial mover tooth of FIG. 5A change places with each other and one permanent magnet is positioned between each of the toothed mover protrusions 1c. The permanent magnets provided on the medial mover tooth are oriented such that the poles thereof are oriented in the same direction as those of the permanent magnets provided on the side mover teeth. In the case of FIG. 5C, the arrangement of the toothed mover protrusions 1c and the permanent magnets on the side mover teeth is the same as that of FIG. 4. In addition, an even number of permanent magnets and toothed mover protrusions alternate with each other on the end of a medial mover tooth. In the case of FIG. 5D, the arrangement of toothed mover protrusions 1c and permanent magnets on a medial mover tooth is the same as that of FIG. 5B. In addition, each of the two side mover teeth is configured such that the toothed mover protrusion is positioned between the two permanent magnets. In the case of FIG. 5E, permanent magnets are provided in line on the three mover teeth without having toothed mover protrusions such that the poles of the permanent magnets alternate with each other. In the case of FIG. 5F, the arrangement of toothed mover protrusions 1c and permanent magnets on the medial mover tooth is the same as that of FIG. 4. In addition, two toothed mover protrusions are provided on the end of each mover teeth on both sides. A permanent magnet is positioned between the two toothed mover protrusions such that the poles thereof are oriented in the same directions as those of the permanent magnets provided on the medial mover.

Figure 6:
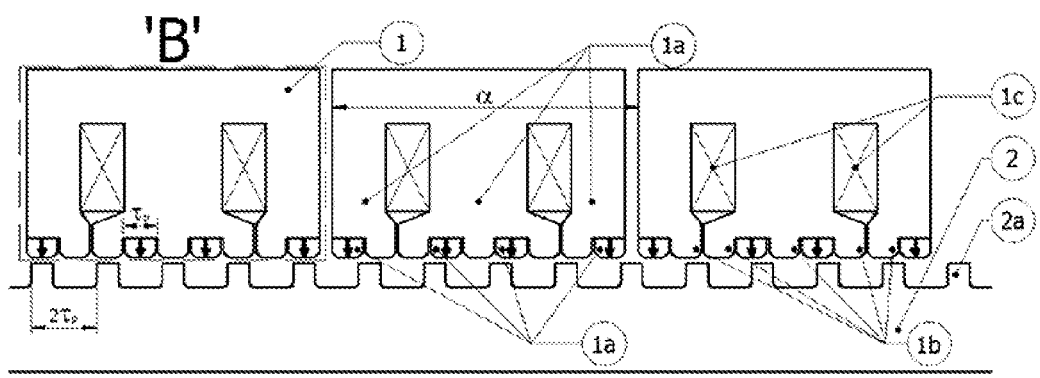
FIG. 6 is a view illustrating a linear electric machine with a modification of the 'm'-shaped mover iron core structure in which an opening between the mover teeth is semi-closed, according to the present invention.

FIG. 6 illustrates a modification of an 'm'-shaped mover iron core 1 of FIG. 4. In this modification, the mover teeth 1a have a semi-closed opening structure, and coils are provided between the semi-closed mover teeth 1a. FIGS. 7A through 7F are views showing various examples of portion 'B' of FIG. 6 and illustrating the flux $\Phi$ of each example. As shown in FIGS. 7A through 7F, the structure of the mover can be modified in many ways depending on both the number of toothed mover protrusions provided on the ends of the mover teeth and on the arrangement of the toothed mover protrusions and the permanent magnets.

Figure 7A:
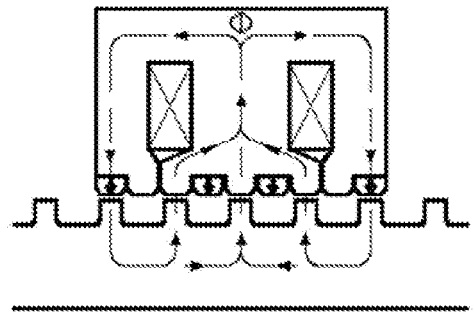
FIGS. 7A through 7F are views showing various examples of the 'm'-shaped mover iron core structure that has the semi-closed opening of FIG. 6.
Figure 7B:
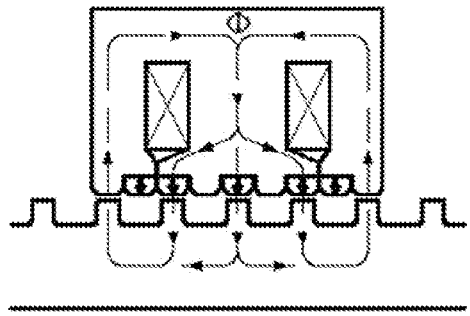
Figure 7C:
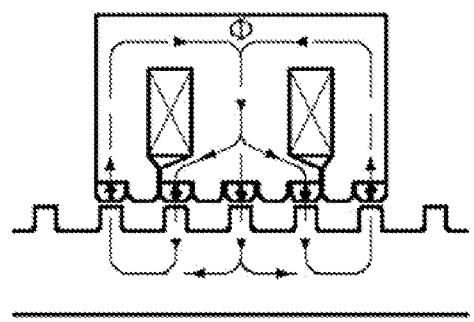
Figure 7D:
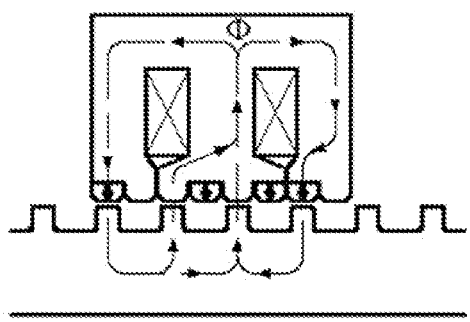
Figure 7E:
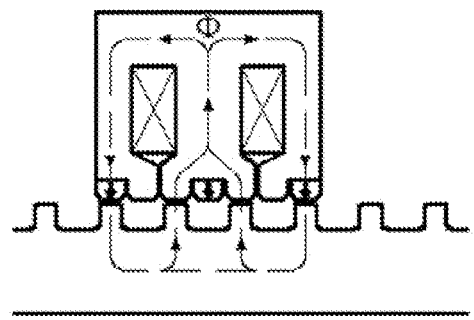
Figure 7F:
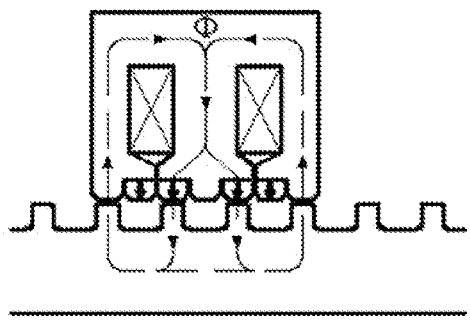

FIG. 7A illustrates the same structure as that of FIG. 6. In this structure, the medial one of three mover teeth has a pole shoe structure (for example, an upper portion around which the coils are wound is thinner than the lower portion on which the toothed mover protrusions are formed) in the same manner as that of FIG. 3D. The ends of both side mover teeth are positioned adjacent to the end of the medial mover tooth, so that the mover teeth 1a have a semi-closed structure (in which the lower side of the coils is partially closed). Furthermore, three toothed mover protrusions are provided on the end of the medial mover tooth, and permanent magnets are positioned between the toothed mover protrusions. One toothed mover protrusion and one permanent magnet are provided on the end of each of both side mover teeth. FIG. 7B illustrates a semi-closed structure such that the toothed mover protrusions are positioned between permanent magnets on the end of a medial mover tooth and the arrangement order of toothed mover protrusions and permanent magnets on the ends of both side mover teeth is opposite to that of FIG. 7A. FIG. 7C illustrates a semi-closed structure where the toothed mover protrusions are positioned between permanent magnets on the end of a medial mover tooth and an arrangement order of toothed mover protrusions and permanent magnets on the ends of both side mover teeth is the same as that of FIG. 7A. FIG. 7D illustrates a semi-closed structure such that an even number of toothed mover protrusions and permanent magnets alternate with each other on the end of a medial mover tooth. In addition, in the case of FIG. 7D, an arrangement order of a toothed mover protrusion and a permanent magnet on the end of one of both side mover teeth is the same as that of FIG. 7A, and their arrangement order on the other one of the both side mover teeth is the same as that of FIG. 7B. FIG. 7E illustrates a semi-closed structure where a single permanent magnet is positioned between two toothed mover protrusions on the end of a medial mover tooth and the arrangement order of toothed mover protrusions and permanent magnets on the ends of both side mover teeth is the same as that of FIG. 7A. FIG. 7F illustrates a semi-closed structure where a single toothed mover protrusion is positioned between two permanent magnets on the end of a medial mover tooth and an arrangement order of toothed mover protrusions and permanent magnets on the ends of both side mover teeth is the same as that of FIG. 7B.

Figure 8A:
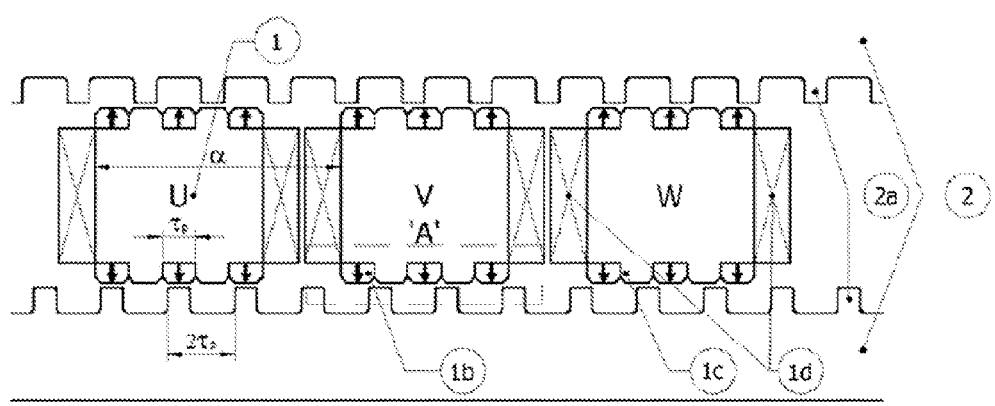
FIGS. 8A and 8B are views illustrating examples of a structure where the stators are positioned on opposite sides of a mover to cancel the attractive force therebetween, according to the present invention.
Figure 8B:
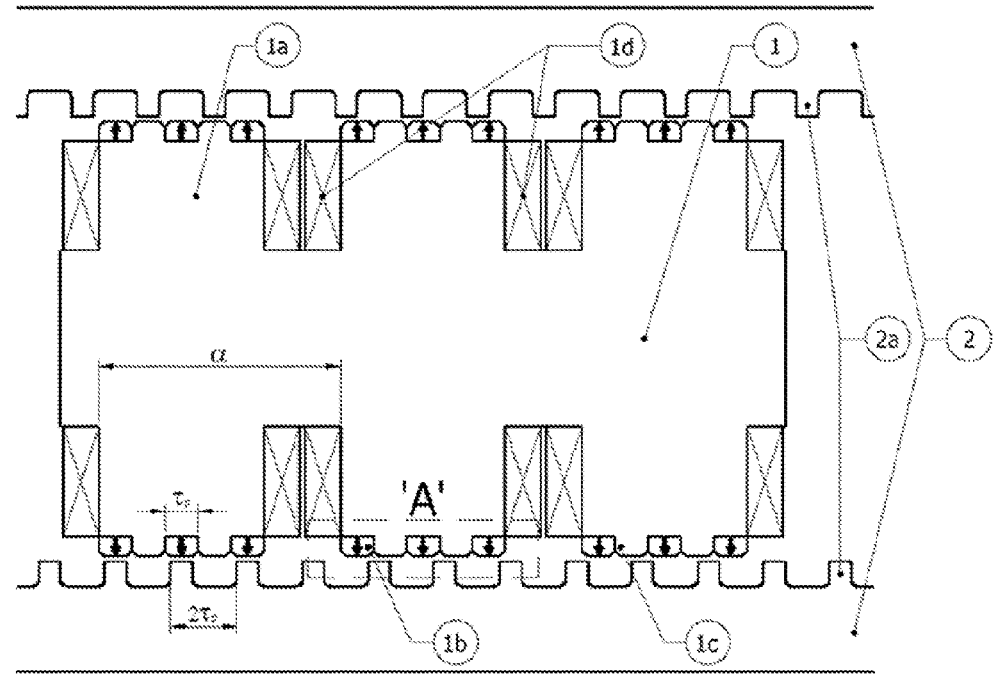

FIGS. 8A and 8B illustrate structures where the stator iron cores 2 are positioned on the opposing upper and lower sides of a mover iron core 1 to cancel the attractive magnetic force between movers and stators. FIG. 8A illustrates a structure where the mover iron cores 1 are mechanically separated from each other. FIG. 8B illustrates a structure where the three mover icon cores 1 are mechanically integrated with each other. Here, the permanent magnets 1b and toothed mover protrusions 1c can be configured on the ends of mover teeth 1a in various shapes in the same manner as those of FIGS. 3A through 3H. As shown in FIG. 8, in the case where the stator iron cores are positioned on the opposing upper and lower sides of the mover iron core 1 such that the teeth of the stator iron cores are misaligned with each other by $\tau_p$, even when the permanent magnets are positioned on both sides of mover teeth such that their same poles face each other, a problem of unbalance of load back-EMF can be mitigated. Furthermore, when the teeth provided on the opposing upper and lower sides of the mover iron core are misaligned with each other by $\tau_p$, the same effect can also be obtained. Here, the mover iron core 1 can have the same shape as that of the above-stated modular mover or 'm'-shaped mover. Permanent magnets and toothed mover protrusions on the ends of the mover teeth can also be configured and arranged by the same method as that of the above-mentioned embodiments.

Figure 9A:
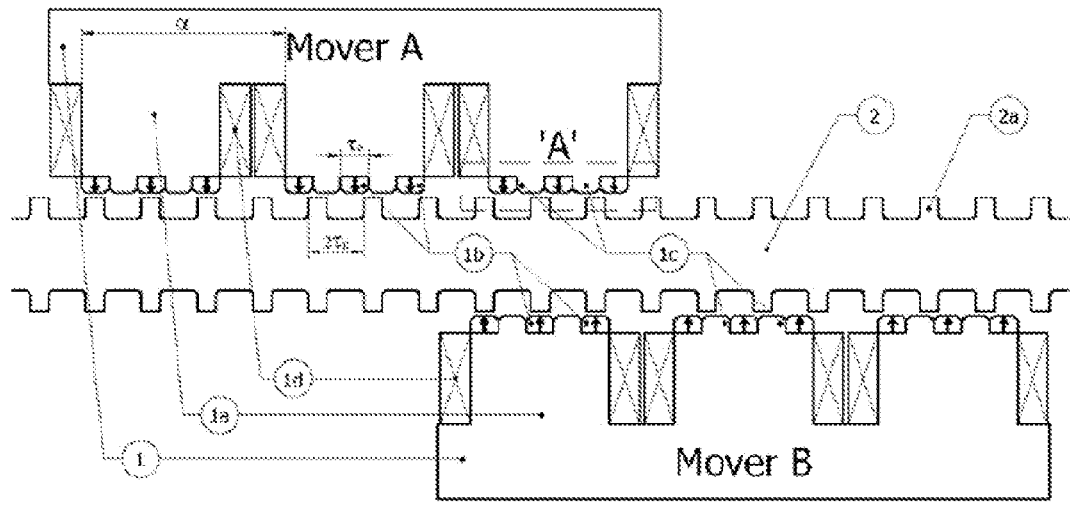
FIGS. 9A and 9B are views illustrating a structure where the movers are positioned on opposite sides of a stator to cancel the attractive force therebetween, according to the present invention.
Figure 9B:
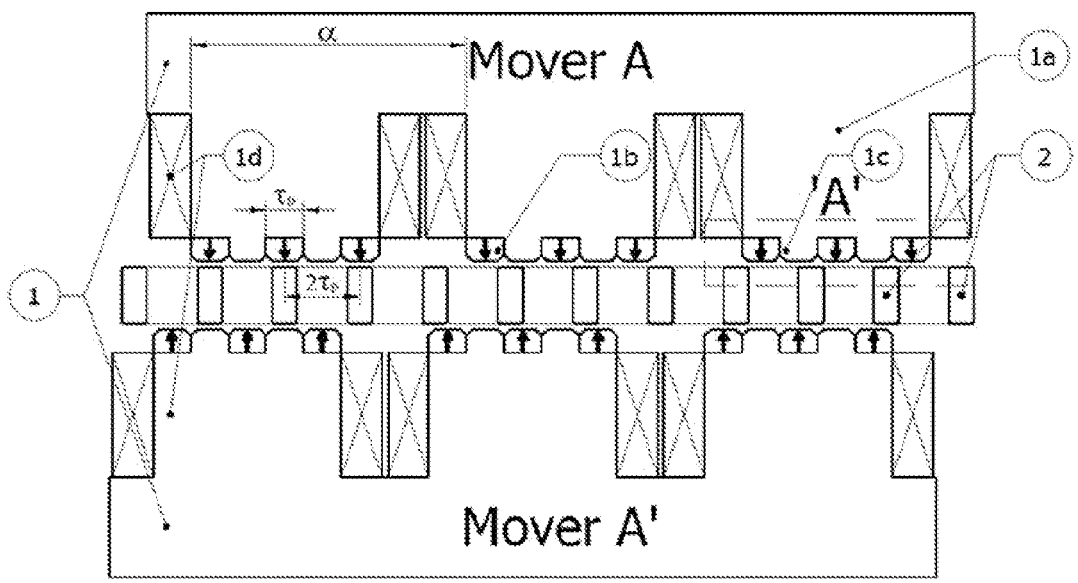

FIGS. 9A and 9B illustrate structures such that teeth are formed on opposing upper and lower sides of a stator iron core 2 and two mover iron cores 1 are respectively positioned adjacent to the upper and lower teeth of the stator iron core 2. FIG. 9A illustrates a structure such that the movers (Mover A and Mover B) can be independently operated. FIG. 9B illustrates a structure such that a pair of movers (Mover A and Mover B) which face each other are operated together.

In the case of FIG. 9B, a stator 2 can be provided only with stator teeth which are arranged at intervals of $2\tau_p$, thus reducing the weight and volume of the stator 2. Moreover, the magnetic attractive force between the stator and the movers can be canceled. In the structure shown in FIG. 9B, when the upper and lower movers are positioned such that the toothed mover protrusions of the movers are misaligned by $\tau_p$, even when the permanent magnets are positioned on the ends of the mover teeth such that their same poles face each other, the back-EMF unbalance problem can be mitigated. Furthermore, when the stator teeth are misaligned with each other by $\tau_p$, the same effect can also be obtained. Here, the mover iron core 1 can have the same shape as that of the above-stated modular mover or 'm'-shaped mover. The permanent magnets and toothed mover protrusions on the ends of the mover teeth can also be configured and arranged by the same method as that of the above-mentioned embodiments.

Figure 10A:
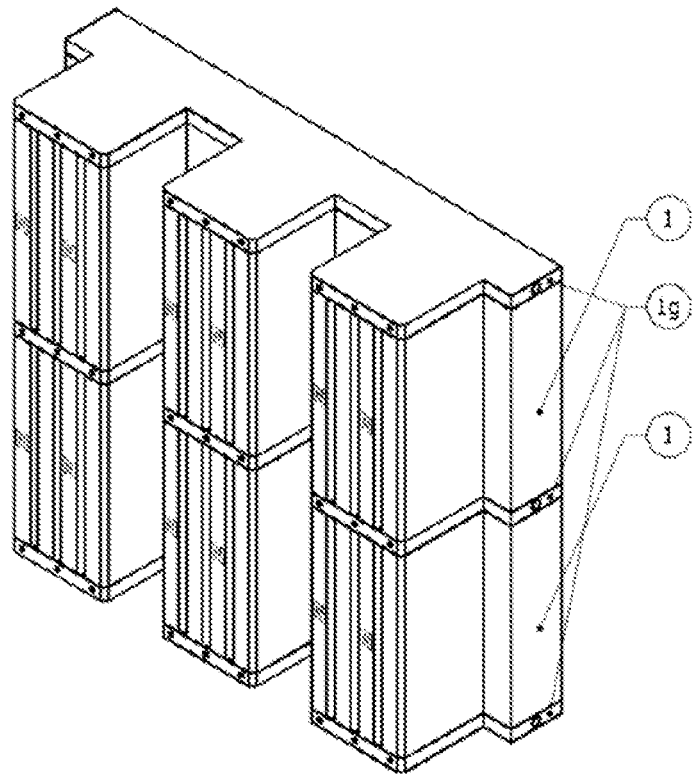
FIGS. 10A through 10C are views showing the construction of a mover iron core and a thin cooling unit and several examples of the thin cooling unit, according to the present invention.
Figure 10B:
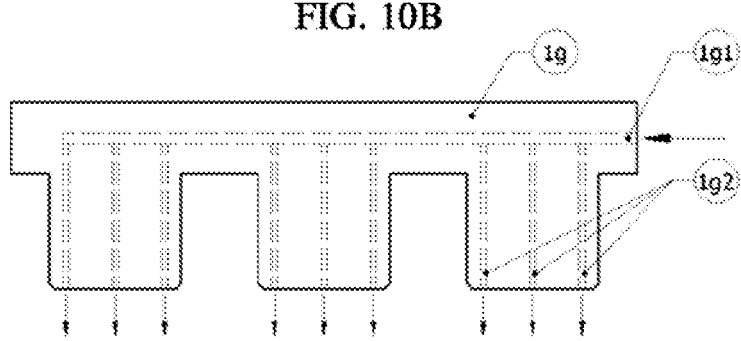

FIG. 10A is a view illustrating the construction of mover iron cores 1 (or stator iron cores) and thin cooling units 1g. One or more of the thin cooling units 1g can be combined with the mover iron cores 1 (for example, a single thin cooling unit may be interposed between two mover iron cores to form a stacked structure or, alternatively, thin cooling units may be provided between two mover iron cores and on both ends of the mover iron cores to form a stacked structure). FIG. 10B illustrates one example of the thin cooling unit 1g. The thin cooling unit 1g is configured such that cooling fluid is injected into through an inlet 1g1, flows through the mover teeth, and then is discharged through outlets 1g2. The thin cooling unit 1g is thereby cooled by the cooling fluid. As a result of this, the mover iron cores, coils and permanent magnets can be cooled. In addition, the permanent magnets provided on the ends of the mover teeth can be effectively cooled by the fluid discharged through the outlets 1g2, and the stator which is positioned facing the mover teeth can also be effectively cooled by the fluid. Moreover, the discharge pressure of the fluid can prevent impurities from entering the space between the mover and remove impurities therefrom.

Figure 10C:
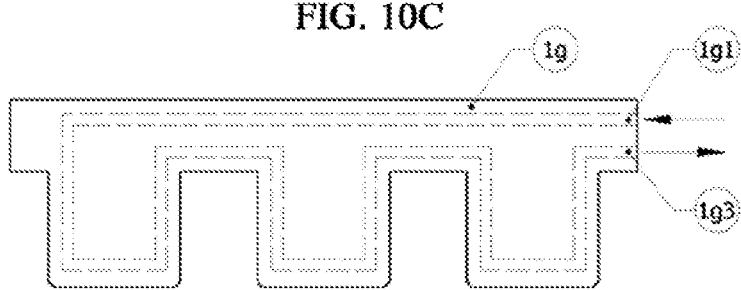

FIG. 10C illustrate another example of the thin cooling unit 1g. Unlike the thin cooling unit 1g of FIG. 10B that has a structure where the fluid is discharged to the outside, the thin cooling unit 1g of FIG. 10C has a cooling fluid circulation structure where the cooling fluid is supplied into the cooling unit 1g through an inlet 1g1, and is discharged to the outside through an outlet 1g3 after passing through the cooling unit 1g, and then is drawn into the cooling unit 1g through the inlet 1g1 again.

As shown in FIGS. 10A through 10C, it is preferable that the cooling unit be manufactured in a thin shape. Furthermore, preferably, the entire shape of the cooling unit should be similar to that of the mover or stator iron core to enhance the cooling efficiency. In addition, because the mover or stator iron core may be manufactured by stacking thin iron plates, several thin cooling units may be provided between the iron plates of the iron core when necessary.

In the same manner, the structure of the thin cooling unit 1g can be used in a rotary electric machine according to the present invention. In addition, the thin cooling unit 1g can also be used in the conventional linear or rotary electric machine including the permanent magnet linear synchronous motor so as to ensure the cooling function and prevent impurities from entering the space between the stator and the mover or remove the impurities.

Figure 11A:
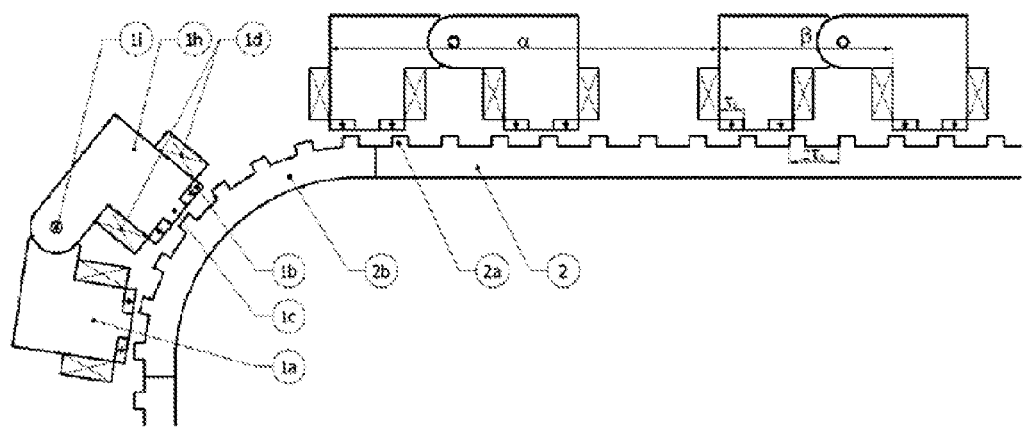
FIGS. 11A and 11B are views showing examples of a linear electric machine which includes a stator having a curved part and a linear part and a mover iron core having a hinge or a mover support plate having a hinge, according to another embodiment of the present invention.
Figure 11B:
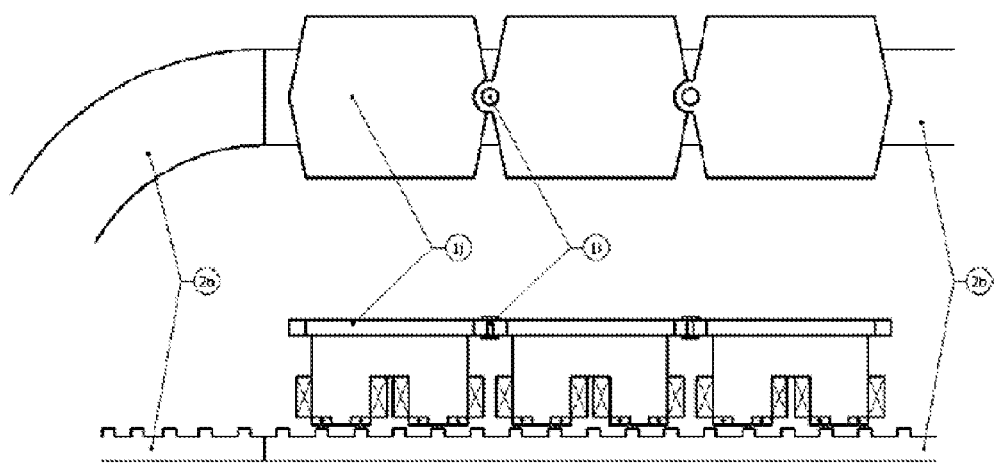

FIGS. 11A and 11B illustrate, as a modification of the modular movers of the above-mentioned embodiments, a linear electric machine which includes a mover iron core 1h having a hinge 1i such that a mover can move in a linear and curved fashion. In detail, in this structure, when a mover iron core 1h that has a hinge 1i moves with respect to a linear stator 2 that has a planar surface and a curved stator 2b that has a curved surface, the mover iron core 1h which has moved along a linear course can smoothly move along a curved course thanks to the structure having the hinge 1i. In particular, as shown in the plane view of FIG. 11B, this linear electric machine may be configured such that the modular movers are attached to a mover support plate 1j that has hinges so that the movers can move in a curved direction.

Meanwhile, in the linear electric machine of FIG. 11, for a three phase case, movers in multiples of three are arranged at intervals of α, and each phase has an electrical phase angle of 120°. Furthermore, the linear electric machine can be constructed in multi-phases of two, four or more phases. In this case, the multi-phases are arranged at appropriate phase angles depending on the drive method.

Figure 12A:
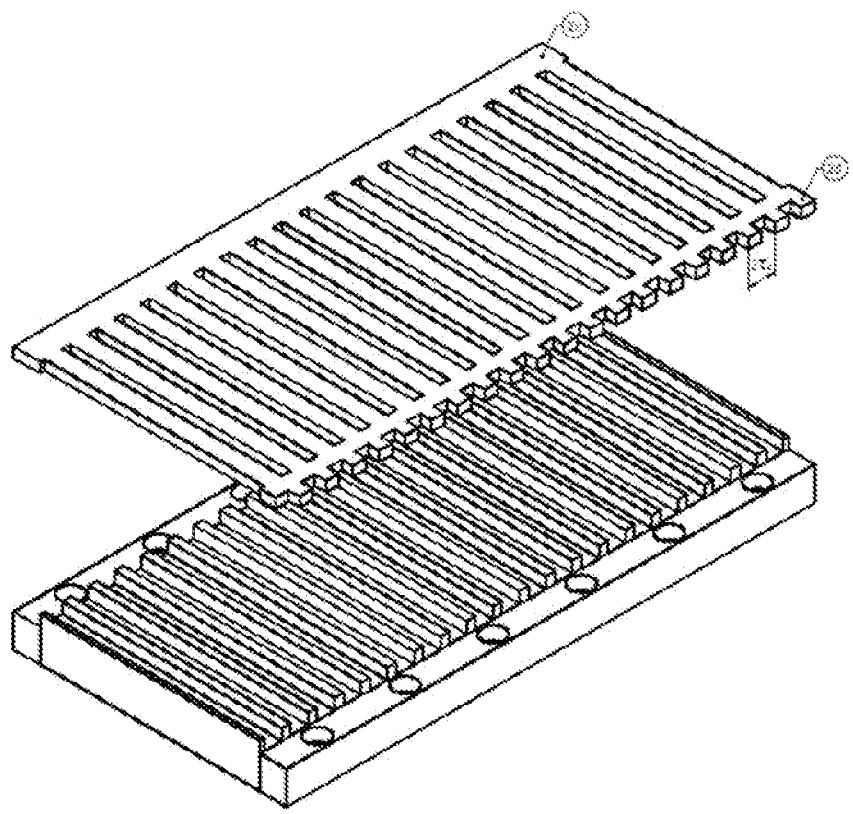
FIGS. 12A and 12B are views illustrating a stator cover and protrusions provided on the stator cover to detect magnetic poles, according to the present invention.
Figure 12B:
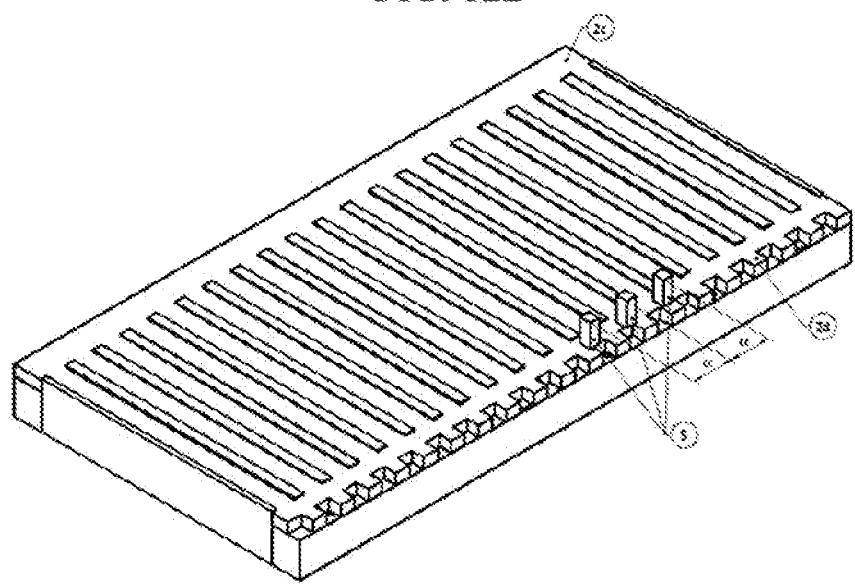

FIGS. 12A and 12B are views illustrating the construction of a stator. In this case, the space between the stator teeth is filled with a stator cover 2c which is made of a non-magnetic material, thus preventing the impurities from being caught between the stator teeth. An uneven portion 2d which has stator cover protrusions spaced apart from each other at regular intervals of $2\tau_p$ may be formed on one edge of the stator cover 2c. As shown in FIG. 12B, the sensors 5 are arranged at electrical phase angles of 120°. The sensors 5 are used as a sensing means for detect a pole detecting signal to sense protrusions and depressions of the uneven portion 2d. The pole detecting structure using the uneven portion 2d can also be used in the rotary electric machine. The sensor 5 is not limited to any special sensing structure, so long as it can detect the protrusions and depressions of the uneven portion 2d. Furthermore, in the case where sensors which can sense stator teeth are used as the sensors 5, they are disposed at positions at which the stator teeth can be detected and are used to detect the poles.

Figure 13A:
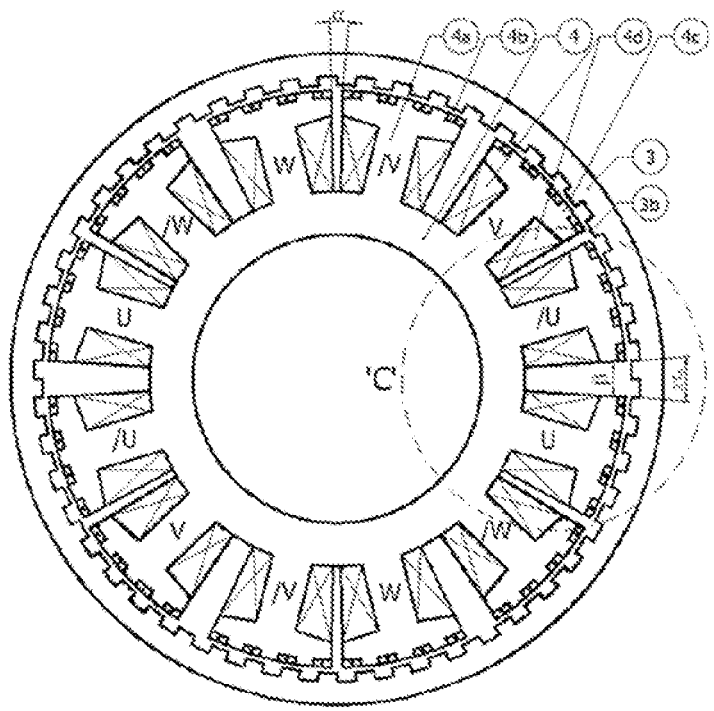
FIGS. 13A and 13B are views illustrating examples of an outer-rotor electric machine in which permanent magnets are provided on a stator, according to another embodiment of the present invention.
Figure 13B:
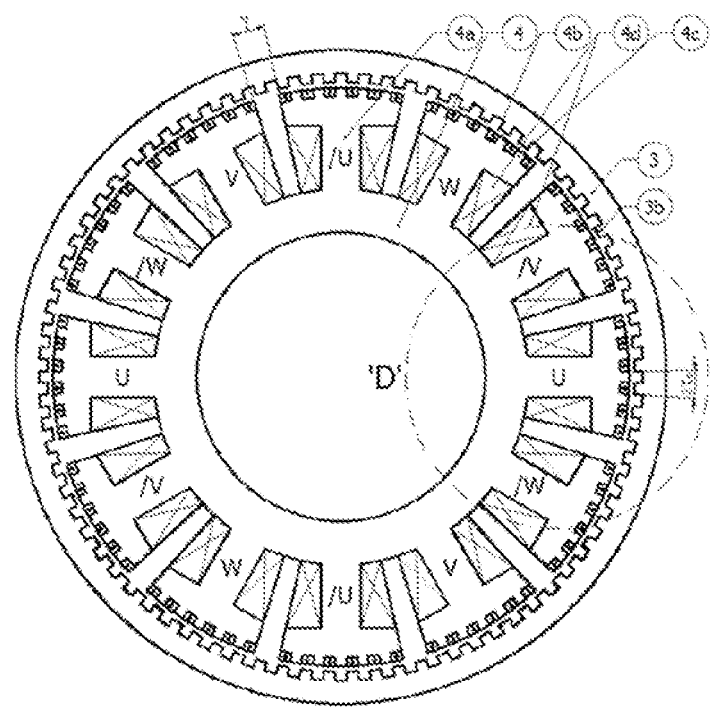

FIGS. 13A and 13B are views illustrating examples of an outer-rotor electric machine according to the present invention. FIG. 13A illustrates a case where the linear electric machine that has the modular mover structure shown in FIG. 1B is used as an outer-rotor electric machine. In this case, phases U and /U, phases V and /V, and phases W and /W are arranged at intervals of β, such that electrical phase differences of 180° exist between phases U and /U, phases V and /V, and phases W and /W. Furthermore, the phases are arranged at intervals of α, so that electrical phase differences of 120° exist therebetween. FIG. 13B illustrates a case where the linear electric machine with the modular mover structure shown in FIG. 1C (in which a phase difference between the adjacent phase coils is 60°) is used as an outer-rotor electric machine. In this case, the stator teeth 4a are arranged at intervals of γ so that electrical phase differences of 60° exist therebetween. In the examples shown in FIGS. 13A and 13B, a rotor 3 rotates around a stator 4. One of the structures, which are applied to the movers of the linear electric machines of FIGS. 1 through 7, can be selectively applied to permanent magnets 4b and toothed stator protrusions 4c which are provided at the ends of the stator teeth 4a facing the rotor 3.

FIGS. 14A through 15B are enlarged views of the circled portions 'C' and 'D' of FIGS. 13A and 13B to show several examples depending on the number and arrangement of the permanent magnets and toothed stator protrusions.

Figure 14A:
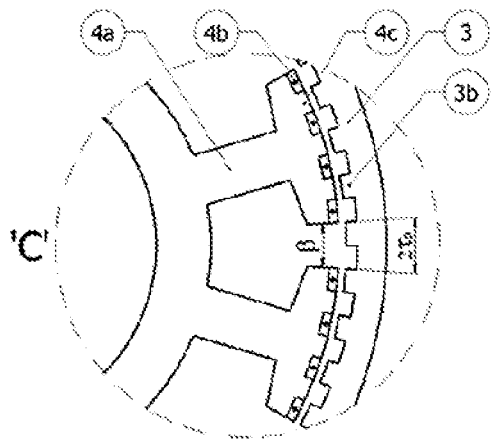
FIGS. 14A through 14E are views showing several examples of permanent magnets in arrangements along with a toothed stator protrusion for the outer-rotor electric machine according to the present invention.
Figure 14B:
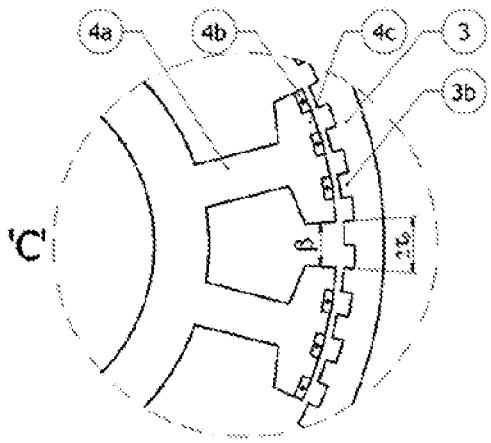
Figure 14C:
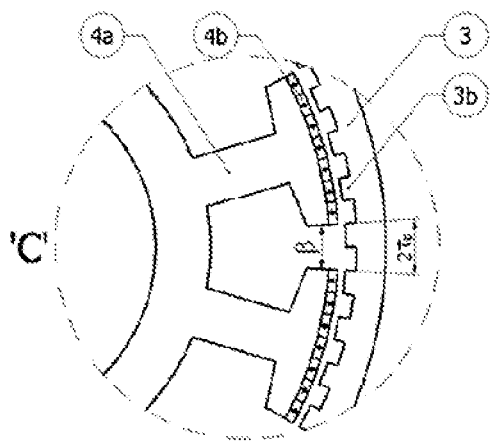
Figure 14D:
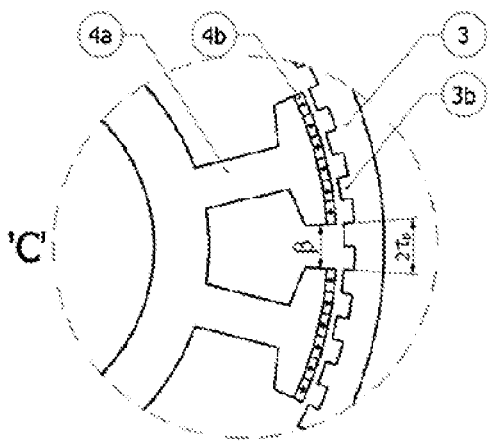
Figure 14E:
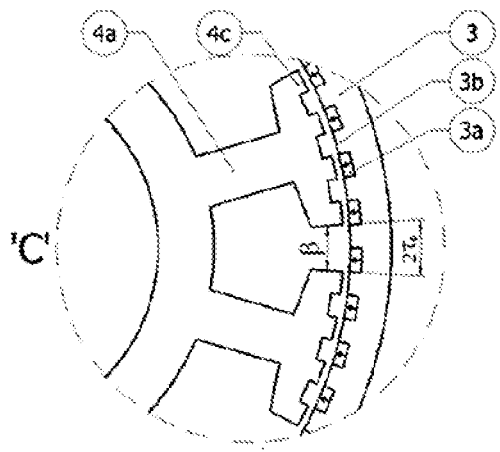

As shown in FIGS. 14A and 14B, toothed stator protrusions 4c may be provided between the permanent magnets 4b on each of the stator teeth 4a facing the rotor 3 (alternatively, the permanent magnets 4b may be provided between the toothed stator protrusions). An odd (or even) number of permanent magnets 4b and an odd (or even) number of toothed stator protrusions 4c may alternate with each other. Furthermore, as shown in FIGS. 14C and 14D, only an odd or even number of permanent magnets 4b may be positioned such that the opposite poles of the permanent magnets 4b alternate with each other. Moreover, as shown in FIG. 14E, the outer-rotor electric machine may be configured in such a way that the permanent magnets 3a which are arranged such that the same poles are oriented in the same direction are provided between rotor teeth 3b, and only the toothed stator protrusions 4c are provided at the ends of the stator teeth 4a.

Figure 15A:
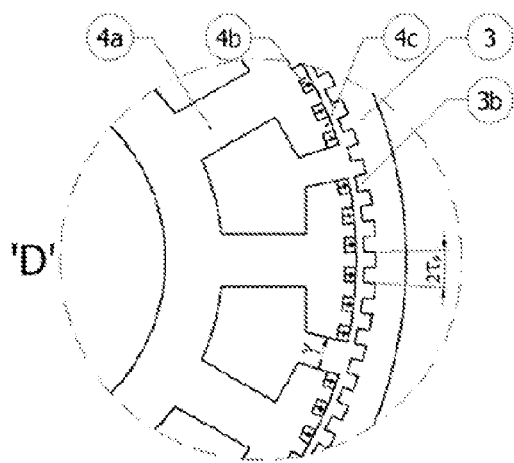
FIGS. 15A through 15B are views showing other examples of arrangement of the permanent magnets and the toothed stator protrusion of the outer-rotor electric machine according to the present invention.
Figure 15B:
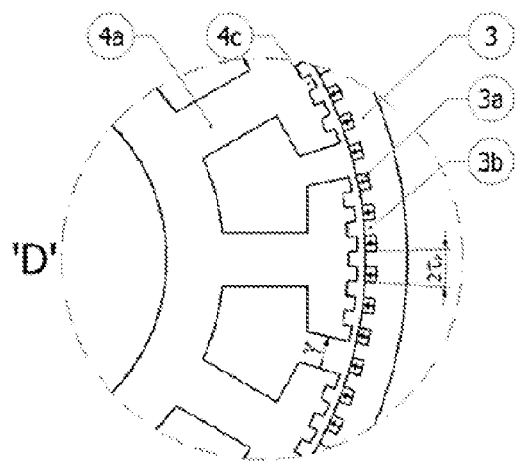

FIG. 15A is an enlarged view of circled portion 'D' of FIG. 13B. Furthermore, as shown in FIG. 15B, the outer-rotor electric machine may be configured in such a way that the permanent magnets 3a which are arranged such that the same poles are oriented in the same direction, are provided between the rotor teeth 3b, and only the toothed stator protrusions 4c are provided at the ends of the stator teeth 4a.

Here, when the entire number of coil phases is n (n denotes a natural number), the stator teeth can be arranged at electrical intervals of 180°/n. The number of stator teeth may be an exact multiple of n. Furthermore, when the iron core of the stator or mover is manufactured in a laminated manner, the stator teeth and the mover teeth may be skewed such that they face each other in a skew shape, thus mitigating the force ripples.

Figure 16A:
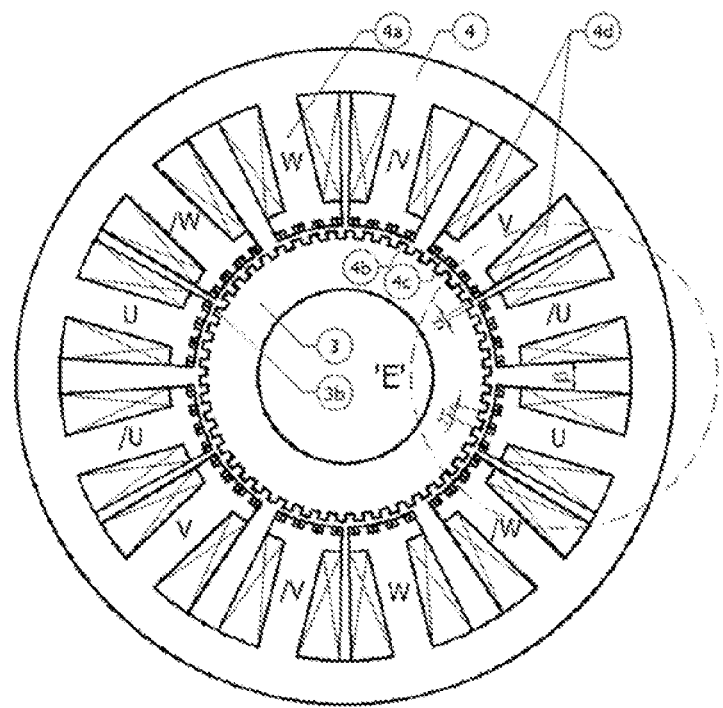
FIGS. 16A and 16B are views illustrating examples of an inner-rotor electric machine in which the permanent magnets are provided on a stator, according to another embodiment of the present invention.
Figure 16B:
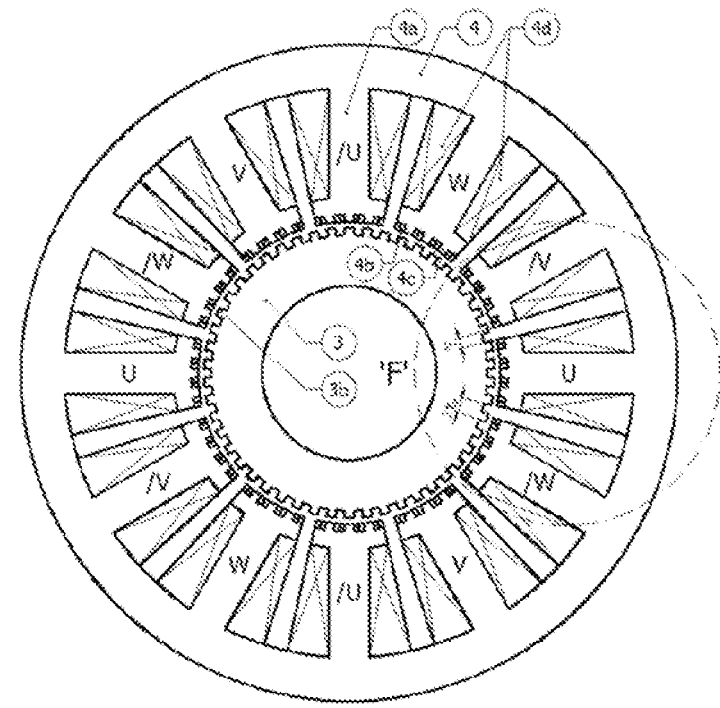

FIGS. 16A and 16B are views illustrating examples of an inner-rotor electric machine, according to the present invention. FIG. 16A illustrates a case where the linear electric machine that has the modular mover structure shown in FIG. 1B is used as an inner-rotor electric machine. In this case, phases U and /U, phases V and /V, and phases W and /W are arranged at intervals of β, such that electrical phase differences of 180° exist between phases U and /U, phases V and /V, and phases W and /W. Furthermore, the phases are arranged at intervals of α, so that electrical phase differences of 120° exist therebetween. FIG. 16B illustrates the case where the linear electric machine that has the modular mover structure shown in FIG. 1C (in which the phase difference between adjacent phase coils is 60°) is used as an inner-rotor electric machine. In this case, the stator teeth 4a are arranged at intervals of γ so that electrical phase differences of 60° exist therebetween. In the examples shown in FIGS. 16A and 16B, a rotor 3 rotates inside a stator 4. One of the structures which are applied to the movers of the linear electric machines proposed in the above-mentioned embodiments can be selectively applied to the permanent magnets 4b and the toothed stator protrusions 4c which are provided on the ends of the stator teeth 4a facing the rotor 3.

FIGS. 17A through 18B are enlarged views of the circled portions 'E' and 'F' of FIGS. 16A and 16B that show several examples classified depending on the number and arrangement of permanent magnets 4b and toothed stator protrusions 4c.

Figure 17A:
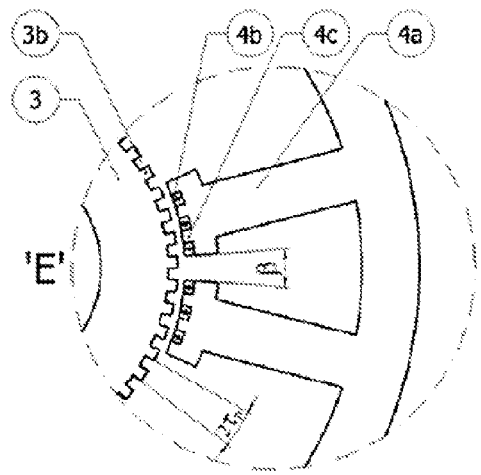
FIGS. 17A through 17D are views showing several examples of arrangement of permanent magnets and a toothed stator protrusion of the inner-rotor electric machine according to the present invention.
Figure 17B:
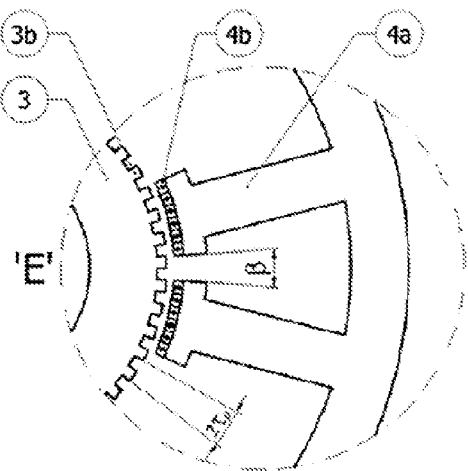
Figure 17C:
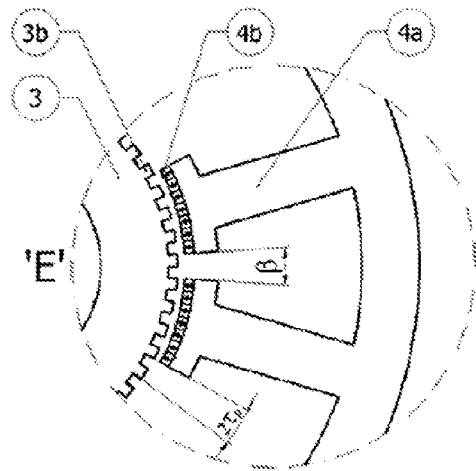
Figure 17D:
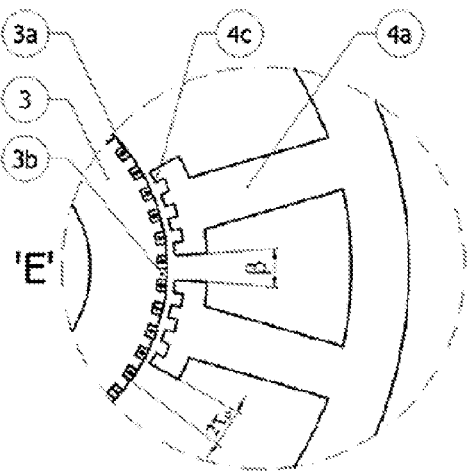

As shown in FIG. 17A, an odd (or even) number of permanent magnets 4b and an odd (or even) number of toothed stator protrusions 4c may alternate with each other on each of stator teeth 4a which face the rotor 3. Furthermore, as shown in FIGS. 17B and 17C, an odd or even number of permanent magnets 4b may be positioned such that the opposite poles of the permanent magnets 4b alternate with each other. Moreover, as shown in FIG. 17D, the inner-rotor electric machine may be configured in such a way that the permanent magnets 3a which are arranged such that the same poles are oriented in the same direction are provided between the rotor teeth 3b, and only toothed stator protrusions 4c are provided on the ends of the stator teeth 4a.

Figure 18A:
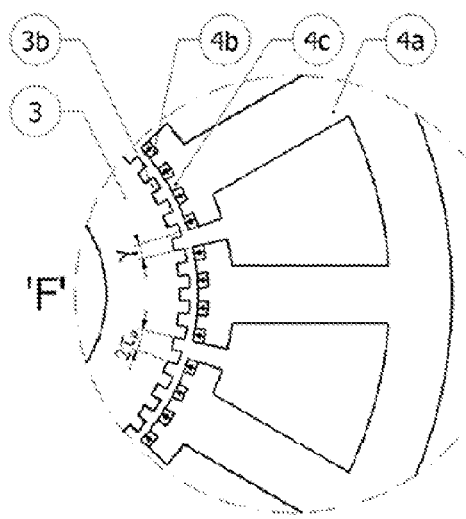
FIGS. 18A through 18B are views showing other arrangement examples for the permanent magnets and toothed stator protrusion of the inner-rotor electric machine according to the present invention.
Figure 18B:
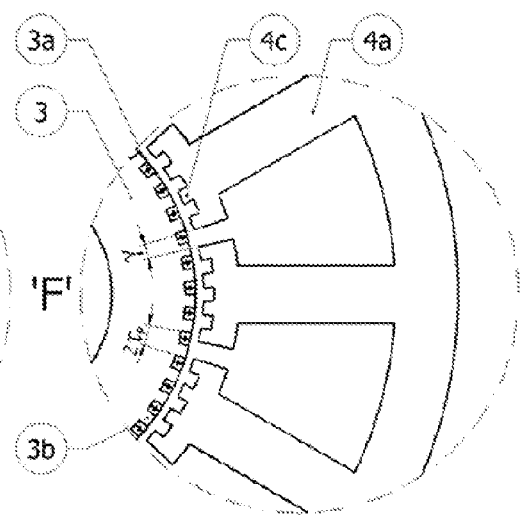

FIG. 18A is an enlarged view of a circled portion 'F' of FIG. 16B. Furthermore, as shown in FIG. 18B, the inner-rotor electric machine may be configured in such a way that the permanent magnets 3a, which are arranged such that the same poles are oriented in the same direction, are provided between the rotor teeth 3b, and only the toothed stator protrusions 4c are provided on the ends of the stator teeth 4a.

Figure 19A:
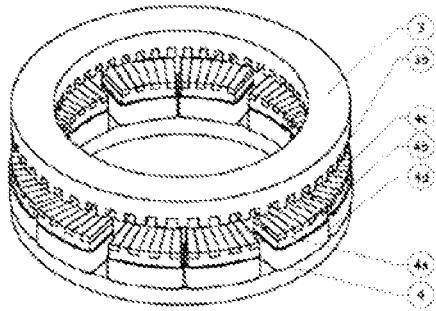
FIGS. 19A through 19C are views showing examples of a rotary machine that has an axial opening, according to an embodiment of the present invention.

FIG. 19A illustrates a case where the linear electric machine of FIG. 1B is used a rotary electric machine with an axial air gap (defined between a rotor and a stator).

Figure 19B:
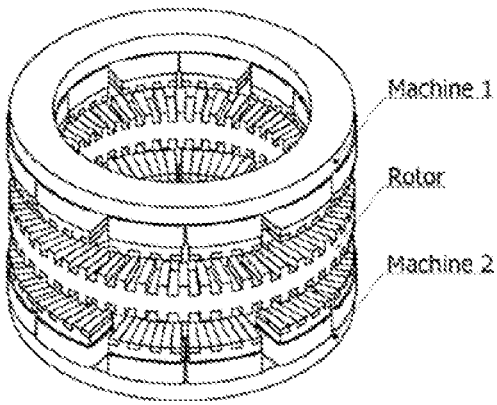

FIG. 19B illustrates a case where the embodiment of FIG. 9 is used in a structure that has an axial air gap. In this case, two stators which face in the axial direction are positioned on opposite sides of a rotor. Thus, the rotor rotates between the two stators so that the attractive force between the stators and the mover can be canceled. Moreover, the embodiment of FIG. 8 may be applied to the structure that has an axial air gap. In this case, two rotors which face in the axial direction are positioned on the opposite sides of a stator. Thereby, the two rotors rotate on opposite sides of the stator so that the attractive force between the stators and the mover can be canceled.

Figure 19C:
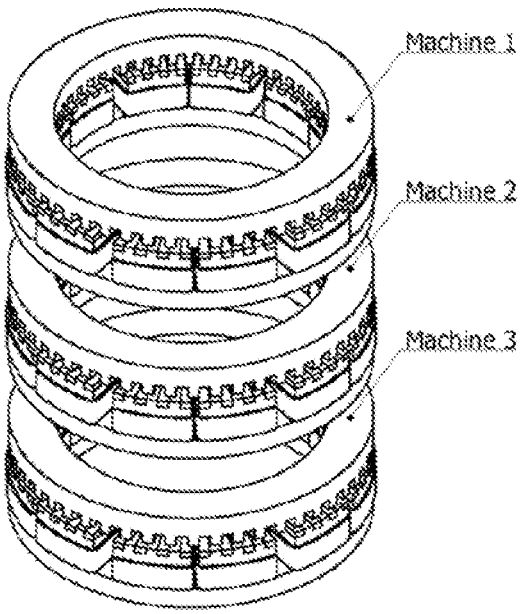

FIG. 19C illustrates an example in which a plurality of electric machines that have the structure shown in FIG. 19A are arranged in the axial direction. In other words, electric machines that have an axial air gap are coaxially provided. In this case, the above-mentioned axial air gap type electric machine, which is configured such that attractive force can be canceled, may be used as each electric machine of FIG. 19C. Furthermore, in a rotary electric machine that has an axial air gap, the construction of the stator and mover can also be modified in many ways by the methods illustrated in the above-mentioned embodiments.

Moreover, in a case for the outer-rotor and inner rotor electric machine according to the present invention, flux concentrators may be used in the structure using permanent magnets or a combination of permanent magnets and toothed protrusions to enhance the air-gap flux density.

Figure 20:
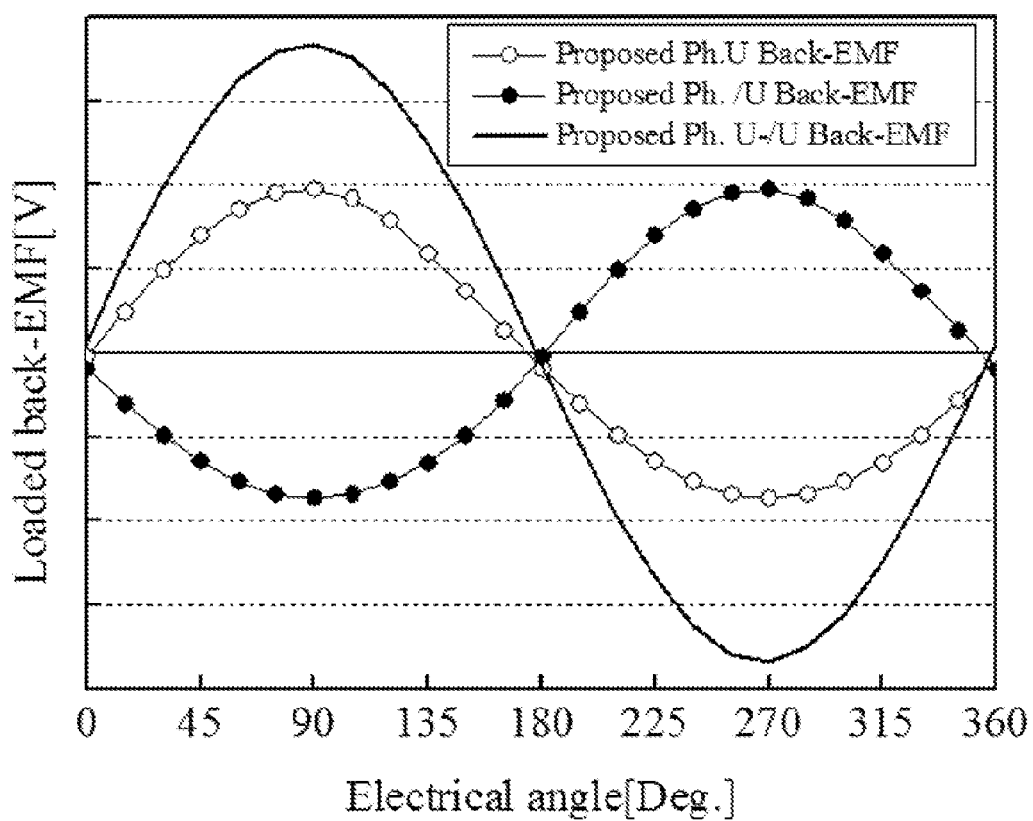
FIG. 20 is a graph showing the reduction of the load back-EMF unbalance using the structure proposed in the present invention.

FIG. 20 shows the fact that a back-EMF wave profile between U and /U becomes even in a range from 0° to 360° using the structure of serial connections of U and /U of the modular mover of the present invention.

As described above, in a linear electric machine, according to the present invention, permanent magnets are attached to a mover but not to a stator, so that the amount of permanent magnets used can be reduced, thereby reducing the manufacturing cost. Furthermore, the present invention provides a modular mover structure, which reduces the size of the machine and mitigates the back-EMF unbalance. In addition, the present invention may be configured such that the movers or stators are positioned at opposite sides, so that the attractive force therebetween can be canceled. In a case where a hinge structure is used in modular movers, the movers can be moved in a linear or curved manner in respect to a stator that has a linear portion and a curved portion.

Furthermore, the linear electric machine of the present invention can be modified in various ways by changing the number of toothed mover protrusions of mover teeth, the number of permanent magnets or the orientation of the magnets. Therefore, the present invention can be applied to various systems when necessary.

Meanwhile, a rotary electric machine according to the present invention can have the same structure as that of the linear electric machine. In addition, the number of poles can be easily increased due to its structural characteristics. Thus, the rotary electric machine of the present invention can be used as a low speed direct drive electric machine. Furthermore, the rotary electric machine can be applied to a rotary electric machine that has an axial air gap.

The linear or rotary electric machine according to the present invention can ensure low noise, low vibration, high precision and high thrust. Therefore, the present invention can be used in fields where direct operation or precision position control is required, or in various other machines, such as a generator, a compressor, a processing machine, an industrial electric machine, etc., in which linear or rotary motion is required.

Although the preferred embodiments of the present invention have been disclosed for illustrative purposes, those skilled in the art will appreciate that various modifications, additions and substitutions are possible, without departing from the scope and spirit of the invention. Furthermore, the technique used in the linear electric machine can be applied a rotary electric machine. Of course, the contrary case can also be realized. Meanwhile, the terms "mover", "rotor" and "stator" used in the description of the embodiments are relative concepts. In other words, when necessary, a case where the stator may move while the mover or rotor is stationary can fall within the bounds of the present invention.

The limits of the present invention are not restricted to the above-mentioned embodiments and must be defined by the accompanying claims or the equivalent of the claims.

What is claimed is:

1. An electric machine, comprising:
   a stator;
   a mover configured to move in a linear or a curved manner or to rotate around the stator, the mover having a plurality of mover teeth;
   a plurality of toothed mover protrusions and a plurality of permanent magnets alternately provided on an end of each of the mover teeth, such that the permanent magnets have the same polarity and at least one of left and right edges of each of the mover teeth includes a permanent magnet; and
   phase coils respectively wound around the mover teeth such that an electric phase difference between the phase coils of adjacent mover teeth is 180°,
   wherein a number of coil phases is n (n denotes a natural number), the mover teeth or modular movers each having two mover teeth are arranged at electrical intervals of 180°/n, and a number of the mover teeth or the modular movers is an exact multiple of n.

2. The electric machine as set forth in claim 1, wherein the mover includes a mover iron core, and
   wherein the mover iron cores of different movers are integrated with each other.

3. The electric machine as set forth in claim 1, further comprising:
   at least one thin cooling unit assembled with a stator iron core of the stator or a mover iron core of the mover in a laminated structure.

4. The electric machine as set forth in claim 3, wherein the thin cooling unit has at least one inlet and a plurality of outlets.

5. The electric machine as set forth in claim 3, wherein the thin cooling unit has at least one inlet and at least one outlet, the inlet and outlet being arranged such that fluid drawn into the inlet circulates along an interior peripheral surface of the thin cooling unit and then is discharged to an outside of the thin cooling unit through the outlet.

6. The electric machine as set forth in claim 1, the electric machine further comprising:
   a stator cover formed of a non-magnetic material, the stator cover being provided in a space formed between stator teeth,
   wherein the stator cover includes an uneven portion provided on at least one lateral surface of the stator cover, the uneven portion having protrusions and depressions; and
   a plurality of sensors provided on the stator cover configured to detect magnetic poles in such a way as to sense the protrusions and the depressions of the uneven portion.

7. The electric machine as set forth in claim 1, wherein when the iron core of the stator or mover is manufactured in a laminated manner, an iron core is skewed to reduce force ripples.

8. The electric machine as set forth in claim 1, wherein an iron core of the mover has at least one cavity to reduce a weight thereof.

9. An electric machine, comprising:
   a stator;
   a mover configured to move in a linear or a curved manner or to rotate around the stator, the mover having a plurality of mover teeth;
   a plurality of permanent magnets and a plurality of flux concentrators provided on an end of each of the mover teeth such that the permanent magnets are provided along a perimeter of a corresponding flux concentrator; and
   phase coils respectively wound around the mover teeth such that an electric phase difference between the phase coils of adjacent mover teeth is 180°,
   wherein a number of coil phases is n (n denotes a natural number), the mover teeth or modular movers each having two mover teeth are arranged at electrical intervals of 180°/n, and a number of the mover teeth or the modular movers is an exact multiple of n.

10. The electric machine as set forth in claim 9, wherein a pole piece or the flux concentrators has a curved shape or a polygon shape including a triangular shape, a rectangular shape, a square shape, a trapezoidal shape or a pentagonal shape, or a combined shape containing elements of a curved shape and a polygon shape.

11. An electric machine, comprising:
    a stator; and
    a mover configured to move in a linear or a curved manner or to rotate around the stator, the mover including a plurality of mover teeth, each of the mover teeth including a ramp surface on a left side and on a right side thereof;
    a permanent magnet provided on each of the ramp surfaces of each of the mover teeth;
    a pole piece provided under each of the permanent magnets; and
    phase coils respectively wound around the mover teeth,
    wherein a number of coil phases is n (n denotes a natural number), the mover teeth or modular movers each having two mover teeth are arranged at electrical intervals of 180°/n, and a number of the mover teeth or the modular movers is an exact multiple of n.

12. An electric machine, comprising:
    a stator; and
    a mover configured to move in a linear manner or a curved manner, wherein the mover comprises:
    a mover iron core having an 'm'-shape to form three mover teeth arranged along a longitudinal direction of the mover;
    at least one permanent magnet arranged on an end of each mover tooth such that the mover is configured to move along the longitudinal direction; and
    a coil wound around a medial one of the three mover teeth,
    wherein a number of coil phases is n (n denotes a natural number), the mover teeth are arranged at electrical intervals of 180°/n, and a number of the mover teeth is an exact multiple of n.

13. The electric machine as set forth in claim 12, wherein a plurality of toothed mover protrusions and a plurality of permanent magnets are alternately provided on the end of each of the mover teeth, the toothed mover protrusions being arranged in an array parallel to the longitudinal direction.

14. The electric machine as set forth in claim 12, wherein the permanent magnet and a corresponding pole piece are provided on the end of each of the mover teeth, or the permanent magnet and a corresponding flux concentrator are provided on the end of each of the mover teeth.

15. The electric machine as set forth in claim 12, wherein the medial mover tooth is configured such that a portion thereof on which the coil is provided is thinner than a portion thereof on which toothed mover protrusions are formed, so that the mover has a semi-closed structure in which space between the mover teeth is partially closed.

16. An electric machine, comprising:
a plurality of stators; and
a mover configured to move in a linear or a curved manner or to rotate around the stators, the mover including a plurality of mover teeth disposed on opposite ends of the mover and arranged along a first direction, and the mover moving in a second direction perpendicular to the first direction,
wherein permanent magnets and toothed mover protrusions are provided on an end of each of the mover teeth, or permanent magnets and corresponding flux concentrators are provided on each end of the mover teeth,
wherein permanent magnets provided on the same end of the mover have the same polarity,
wherein the stators are provided on opposite sides of the mover and face the mover teeth, so that an attractive force between the stators and the mover is canceled, and
wherein a number of coil phases is n (n denotes a natural number), the mover teeth or modular movers each having two mover teeth are arranged at electrical intervals of 180°/n, and a number of the mover teeth or the modular movers is an exact multiple of n.

17. An electric machine, comprising:
a stator having stator teeth on opposite surfaces of the stator; and
a plurality of movers configured to move in a linear or a curved manner or to rotate around the stator, each of the movers having a plurality of mover teeth,
wherein permanent magnets and toothed mover protrusions are provided on an end of each of the mover teeth, or permanent magnets and corresponding flux concentrators are provided on each of the ends of the mover teeth,
wherein permanent magnets facing the same side of the stator have the same polarity,
wherein the movers are provided on opposite sides of the stator such that the mover teeth are facing the stator teeth, so that an attractive force between the stator and the movers is canceled, and
wherein a number of coil phases is n (n denotes a natural number), the movers are arranged at electrical intervals of 180°/n, and a number of the movers is an exact multiple of n.

18. The electric machine as set forth in claim 17, wherein the movers move independently or together.

19. An electric machine, comprising:
a stator having a curved surface; a mover configured to move in a curved manner corresponding to the curved surface of the stator, the mover comprising a plurality of mover teeth and a mover iron core, the mover iron core including at least one hinge or being attached to a structure including at least one hinge, so that when the mover moves in the curved manner, the hinge bends at a corresponding curvature;
a plurality of toothed mover protrusions and a plurality of permanent magnets alternately provided on an end of each of the mover teeth such that the permanent magnets have the same polarity and at least one of left and right edges of each of the mover teeth includes a permanent magnet;
a plurality of flux concentrators provided on the end of each of the mover teeth, the permanent magnets being provided along a perimeter of a corresponding flux concentrator; and
phase coils respectively wound around the mover teeth such that an electric phase difference between the phase coils of adjacent mover teeth is 180°.

20. The electric machine as set forth in claim 19, wherein the stator comprises a combination of a planar surface and the curved surface, and the mover iron core moves linearly on the planar surface of the stator and moves in a curved manner on the curved surface of the stator.

21. An electric machine, comprising:
a first stator having stator teeth; a first rotor rotating inside or around the stator;
a plurality of toothed stator protrusions and a plurality of permanent magnets alternately provided on an end of each of the stator teeth such that at least one of left and right edges of each of the stator teeth includes a permanent magnet; and
phase coils respectively provided on stator iron cores of the stator teeth such that an electric phase difference between the phase coils of adjacent stator teeth is 180°,
wherein a number of coil phases is n (n denotes a natural number), the stator teeth are arranged at electrical intervals of 180°/n, and a number of the stator teeth is an exact multiple of n.

22. The electric machine as set forth in claim 21, wherein an air gap is formed between the rotor and the stator with respect to an axial direction.

23. The electric machine as set forth in claim 21, further comprising:
a second stator provided at a position opposite to the first stator and facing the rotor such that the first and second stators are positioned on opposite sides of the rotor with respect to an axial direction, so that the rotor rotates between the first and second stators, or
a second rotor provided at a position opposite to the first rotor and facing the first stator such that the first and second rotors are positioned on opposite sides of the first stator with respect to an axial direction, so that the first and second rotors rotate on opposite sides of the first stator.

24. The electric machine as set forth in claim 23 comprising a plurality of electric machines arranged along the axial direction.

25. The electric machine as set forth in claim 21, wherein when the iron core of the first stator or the first rotor is manufactured in a laminated manner, the iron core is skewed to reduce force ripples.

26. The electric machine as set forth in claim 21, wherein the iron core of the first rotor has at least one cavity to reduce a weight thereof.

27. An electric machine, comprising:
a stator having stator teeth; and
a rotor rotating inside or around the stator;
a plurality of permanent magnets and corresponding pole pieces provided on an end of each of the stator teeth, or a plurality of permanent magnets and corresponding flux concentrators provided on each end of the stator teeth, the permanent magnets being arranged along a perimeter of a corresponding pole piece or along a perimeter of a corresponding flux concentrator; and phase coils respectively provided on stator iron cores of the stator teeth such that an electric phase difference between phase coils of adjacent stator teeth is 180°, wherein a number of coil phases is n (n denotes a natural number), the stator teeth are arranged at electrical intervals of 180°/n, and a number of the stator teeth is an exact multiple of n.

28. The electric machine as set forth in claim 27, wherein each pole piece or flux concentrator has a curved shape or a polygon shape including a triangular shape, a rectangular shape, a square shape, a trapezoidal shape, or a pentagon shape, or a combined shape containing elements of a curved shape and the polygon shape.

29. An electric machine, comprising:

a stator having stator teeth; and a rotor rotating inside or around the stator, wherein the rotor comprises a plurality of rotor teeth, and a permanent magnet is provided between each of the rotor teeth, wherein a plurality of toothed stator protrusions is provided on an end of each of the stator teeth, wherein phase coils are respectively provided on stator iron cores of the stator teeth such that an electric phase difference between the phase coils of adjacent stator teeth is 180°, and wherein the number of coil phases is n, n being a natural number, such that the stator teeth are arranged at electrical intervals of 180°/n.

30. An electric machine, comprising:

a stator having stator teeth; and a rotor rotating inside or around the stator, wherein the rotor comprises a plurality of rotor teeth, and permanent magnets and corresponding flux concentrators are provided on an end of each of the rotor teeth, such that the permanent magnets are arranged along a perimeter of a corresponding flux concentrator, wherein a plurality of toothed stator protrusions is provided on an end of each of the stator teeth, wherein phase coils are respectively provided on stator iron cores of the stator teeth such that an electric phase difference between the phase coils of adjacent stator teeth is 180°, and wherein a number of coil phases is n (n denotes a natural number), the stator teeth are arranged at electrical intervals of 180°/n, and a number of the stator teeth is an exact multiple of n.

31. An electric machine, comprising:

a stator having stator teeth; and at least two movers moving with respect to the stator, the two movers being spaced apart from each other at intervals corresponding to an electrical phase difference of 60°, wherein each of the movers has mover teeth in multiples of three, with phase coils respectively wound around the mover teeth, wherein the phase coils are wound around the mover teeth such that an electric phase difference between the phase coils of adjacent mover teeth is 120°, wherein at least one protrusion is provided on ends of the stator teeth or ends of the mover teeth and at least one permanent magnet is provided on each of left and right sides of the protrusion, or permanent magnets are provided on ends of the stator teeth or ends of the mover teeth such that opposite poles thereof alternate with each other, and wherein the number of coil phases is n, n being a natural number, such that the movers are arranged at electrical intervals of 180°/n.

32. The electric machine as set forth in claim 31, wherein the movers comprises a first mover and a second mover spaced apart from each other at an interval corresponding to an electrical phase difference of 60°, wherein the first mover has mover teeth in multiples of three, and phase coils are respectively wound around a first corresponding mover tooth, the phase coils having phases U, V and W such that an electric phase difference between adjacent phases is 120°, and wherein the second mover has mover teeth in multiples of three, and phase coils are respectively wound around a second corresponding mover tooth, the phase coils having phases /U, /V and /W such that an electric phase difference between adjacent phases is 120°, a phase difference between /U and U being 180°, a phase difference between /V and V being 180°, and a phase difference between /W and W being 180°.

33. An electric machine, comprising:

a stator having stator teeth; and a mover moving with respect to the stator, the mover having mover teeth in multiples of three, wherein phase coils are provided on the mover teeth such that an electric phase difference between the phase coils of adjacent mover teeth is 60°, wherein at least one protrusion is provided on ends of the stator teeth or ends of the mover teeth and at least one permanent magnet is provided on each of left and right sides of the protrusion, or permanent magnets are provided on ends of the stator teeth or ends of the mover teeth such that opposite poles thereof alternate with each other, and wherein the number of coil phases is n, n being a natural number, such that the mover teeth are arranged at electrical intervals of 180°/n.

34. An electric machine, comprising:

a stator having stator teeth; and a rotor rotating inside or around the stator, the rotor having rotor teeth in multiples of three, wherein phase coils are provided on the rotor teeth such that an electric phase difference between the phase coils of adjacent rotor teeth is 60°, wherein at least one protrusion is provided on ends of the stator teeth or ends of the rotor teeth and at least one permanent magnet is provided on each of left and right sides of the protrusion, or permanent magnets are provided on ends of the stator teeth or ends of the rotor teeth such that opposite poles thereof alternate with each other, and wherein the number of coil phases is n, n being a natural number, such that the rotor teeth are arranged at electrical intervals of 180°/n.

\* \* \* \* \*